(12) United States Patent
Matsutani et al.

(10) Patent No.: US 11,527,761 B2
(45) Date of Patent: Dec. 13, 2022

(54) CATHODE ELECTRODE CATALYST OF FUEL CELL, AND REACTION ACCELERATION METHOD

(71) Applicants: TANAKA KIKINZOKU KOGYO K.K., Tokyo (JP); OSAKA UNIVERSITY, Osaka (JP)

(72) Inventors: Koichi Matsutani, Kanagawa (JP); Takeshi Kaieda, Kanagawa (JP); Yasushi Masahiro, Tokyo (JP); Hideaki Kasai, Osaka (JP); Hiroshi Nakanishi, Osaka (JP); Koji Shimizu, Osaka (JP)

(73) Assignees: TANAKA KIKINZOKU KOGYO K.K., Tokyo (JP); OSAKA UNIVERSITY, Osaka (JP)

( * ) Notice: Subject to any disclaimer, the term of this patent is extended or adjusted under 35 U.S.C. 154(b) by 291 days.

(21) Appl. No.: 16/441,855

(22) Filed: Jun. 14, 2019

(65) Prior Publication Data
US 2019/0296363 A1 Sep. 26, 2019

Related U.S. Application Data

(63) Continuation of application No. 15/575,279, filed as application No. PCT/JP2016/068125 on Jun. 17, 2016, now abandoned.

(30) Foreign Application Priority Data

Jul. 14, 2015 (JP) ................................. 2015-140836

(51) Int. Cl.
| | | |
|---|---|---|
| *H01M 4/86* | (2006.01) | |
| *B01J 23/50* | (2006.01) | |
| *B01J 35/00* | (2006.01) | |
| *H01M 4/92* | (2006.01) | |
| *B01J 23/42* | (2006.01) | |
| *H01M 4/90* | (2006.01) | |

(52) U.S. Cl.
CPC ........... *H01M 4/8657* (2013.01); *B01J 23/42* (2013.01); *B01J 23/50* (2013.01); *B01J 35/002* (2013.01); *B01J 35/008* (2013.01); *B01J 35/0013* (2013.01); *B01J 35/0033* (2013.01); *H01M 4/9041* (2013.01); *H01M 4/92* (2013.01); *H01M 4/925* (2013.01); *H01M 4/928* (2013.01); *H01M 2004/8689* (2013.01)

(58) Field of Classification Search
CPC .......... B01J 35/008; B01J 23/50; B01J 23/42; H01M 4/92–928
See application file for complete search history.

(56) References Cited

U.S. PATENT DOCUMENTS

| | | |
|---|---|---|
| 2010/0086832 A1 | 4/2010 | Lopez et al. |
| 2010/0092841 A1 | 4/2010 | Lopez et al. |
| 2011/0086295 A1 | 4/2011 | Lopez et al. |
| 2011/0200915 A1* | 8/2011 | Goto ................. H01M 4/925 502/331 |
| 2011/0275009 A1 | 11/2011 | Goto et al. |
| 2012/0010069 A1 | 1/2012 | Takehiro |
| 2012/0046164 A1 | 2/2012 | Tanaka et al. |
| 2013/0324391 A1 | 12/2013 | Shao |
| 2014/0038078 A1 | 2/2014 | Shao |

FOREIGN PATENT DOCUMENTS

| | | |
|---|---|---|
| EP | 2351614 | 8/2011 |
| JP | 08-138683 | 5/1996 |
| JP | 08138683 | 5/1996 |
| JP | 2009158253 A * | 7/2009 |
| JP | 2010-501344 | 1/2010 |
| JP | 2010-092799 | 4/2010 |
| JP | 2011-072981 | 4/2011 |
| JP | 2012-016684 | 1/2012 |
| JP | 2013-013878 | 1/2013 |
| JP | 2013-163137 | 8/2013 |
| JP | 2014-512252 | 5/2014 |
| JP | 2014-516465 | 7/2014 |
| JP | 2016-108635 | 6/2016 |
| WO | 2008/025750 | 3/2008 |
| WO | 2012/105978 | 8/2012 |
| WO | 2014/065777 | 5/2014 |

OTHER PUBLICATIONS

Machine Translation of JP 2009-158253 A (Year: 2009).*
Office Action for JP Patent Application No. 2017-528345, dated May 19, 2020, 8 pages.
Zhang, Geng et al., Aqueous-Phase Synthesis of Sub . . . The Journal of Physical Chemistry C, May 22, 2013, vol. 117, No. 26, p. 13413-13423.
Shao M.H. et al., Enhanced Oxygen Reduction Activity of Platinum Monolayer on Gold Nanoparticles, J. Phys. Chem. Lett., 2011, 2, 67-72.
Zhang J. et al., Platinum Monolayer Electrocatalysts for O2 Reduction: Pt Monolayer on Pd(111) and on Carbon-Supported Pd Nanoparticles, J. Phys. Chem. B, 2004, 108(30), 10955-10964.
English Translation of International Preliminary Report on Patentability for PCT/JP2016/068125, dated Jan. 16, 2018.

(Continued)

*Primary Examiner* — Robert S Carrico
(74) *Attorney, Agent, or Firm* — Casimir Jones, SC; Robert A. Goetz

(57) ABSTRACT

Provided are (i) a catalyst that has a core-shell structure and is highly active in an oxygen reduction reaction, which is a cathode reaction of a fuel cell, and (ii) a reaction acceleration method in which the catalyst is used. A core-shell catalyst for accelerating an oxygen reduction reaction, contains: silver or palladium as a core material; and platinum as a shell material, the core-shell catalyst having, on a surface thereof, a (110) surface of a face centered cubic lattice.

2 Claims, 16 Drawing Sheets

(56) References Cited

OTHER PUBLICATIONS

International Search Report for PCT/JP2016/068125, dated Jul. 26, 2016.
EP search report, EP Patent Application No. 16824213.9, dated Feb. 12, 2019, 6 pages.
Non-Final Rejection, U.S. Appl. No. 15/575,279, dated Sep. 20, 2018.
Final Rejection, U.S. Appl. No. 15/575,279, dated Jan. 14, 2019.

* cited by examiner

[1̄10] ↑
→ [001]

Unit: eV

| Site | Top | S-bridge | L-bridge | Hollow |
|---|---|---|---|---|
| Pt | −0.389 | −0.890 | −0.280 | 0.191 |
| Pt$_{ML}$Ag | −0.068 | −1.004 | −0.720 | 0.662 |
| Pt$_{ML}$Pd | −0.424 | −0.999 | −0.661 | 0.184 |

Unit: eV

| Site | Top | S-bridge | L-bridge | Hollow |
|---|---|---|---|---|
| Pt | −0.367 | −1.644 | −2.733 | −2.656 |
| Pt$_{ML}$Ag | −0.381 | −1.470 | −1.297 | −3.326 |
| Pt$_{ML}$Pd | −0.467 | −1.731 | −3.083 | −3.060 |

FIG. 9

|  | Pt | Ag | Pd |
|---|---|---|---|
| Calculated value | 3.977 | 4.166 | 3.957 |
| Experimental value | 3.92 | 4.09 | 3.89 |

Unit: Å

FIG. 13
| Site | Potential energy |
| --- | --- |
| Top | −1.79 |
| S-bridge | −2.85 |
Unit: eV
FIG. 14
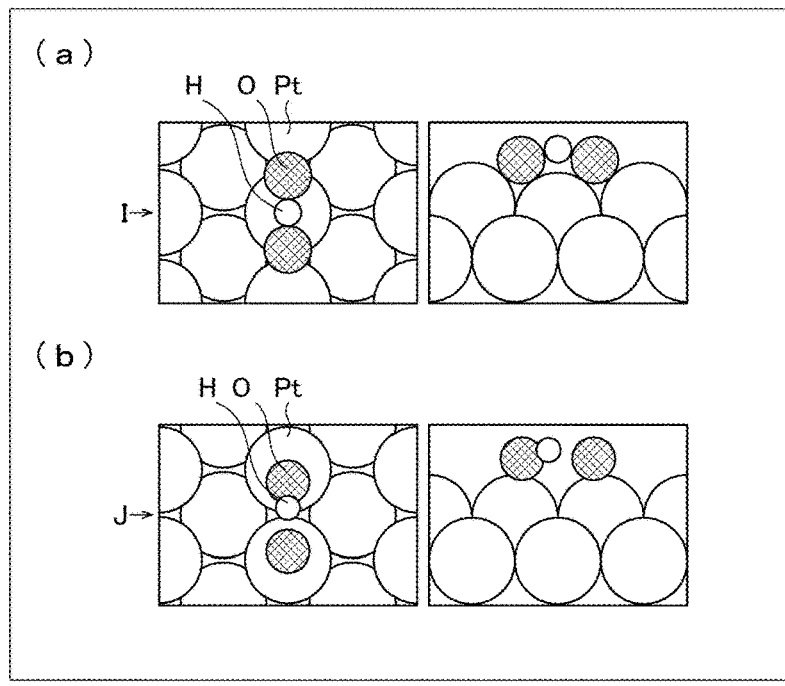
FIG. 15
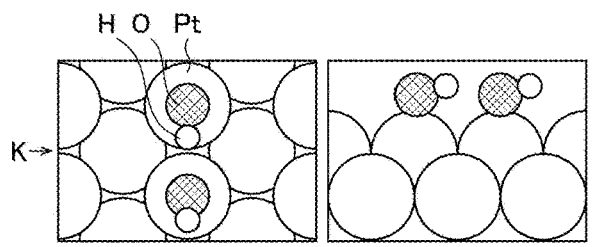
FIG. 16
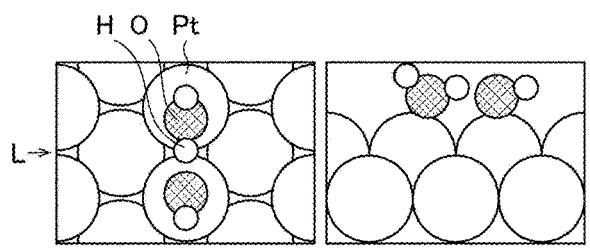

CATHODE ELECTRODE CATALYST OF FUEL CELL, AND REACTION ACCELERATION METHOD

TECHNICAL FIELD

The present invention relates to a core-shell catalyst and a reaction acceleration method in which the core-shell catalyst is used.

BACKGROUND ART

Conventionally, a highly active platinum material has been mainly used as an electrode catalyst of a fuel cell. Note, however, that, platinum, which is a rare metal and is expensive, is required to be used in a smaller amount.

In order that a smaller amount of platinum is used in an electrode catalyst of a fuel cell, a method is proposed in which a smaller amount of platinum is used by forming a catalyst particle having a core-shell structure into an electrode catalyst by causing a carrier to support the catalyst particle. The core-shell structure is a structure in which platinum, which is a highly active material, is used only in a surface (shell) of a catalyst particle and a material different from platinum is used in an inner part (core) of the catalyst particle which inner part does not contribute to a catalytic reaction.

For example, Patent Literature 1 discloses a core-shell catalyst in which ruthenium is used in a core and platinum is used in a shell. The core-shell catalyst is made highly catalytically active by being less poisoned with carbon monoxide.

CITATION LIST

Patent Literature

[Patent Literature 1]
Japanese Patent Application Publication, Tokukai, No. 2011-72981 (Publication Date: Apr. 14, 2011)

Non-Patent Literatures

[Non-Patent Literature 1]
Zhang. J., J. Phys. Chem. B, 2004, 108(30), 10955-10964
[Non-Patent Literature 2]
Shao. M. H. et. al., J. Phys. Chem. Lett., 2011, 2, 67-72

SUMMARY OF INVENTION

Technical Problem

Note, however, that Patent Literature 1, which has an object to provide a core-shell catalyst that is made highly catalytically active by being less poisoned with carbon monoxide, does not consider an oxygen reduction reaction, which is a cathode reaction of a fuel cell.

The present invention has been made in view of the problems, and an object of the present invention is to provide (i) a catalyst that has a core-shell structure and is highly active in an oxygen reduction reaction, which is a cathode reaction of a fuel cell, and (ii) a reaction acceleration method in which the catalyst is used.

Solution to Problem

In order to attain the object, the inventors of the present invention carried out first-principles calculation in which Computational Material Design (CMD) (see Introduction to Computational Materials Design—From the Basics to Actual Applications- (edited by Hideaki KASAI et al., published by Osaka University Press on Oct. 20, 2005)) was used. As a result of diligent study, the inventors focused on silver and palladium as core materials and finally accomplished the present invention.

Specifically, a core-shell catalyst in accordance with an embodiment of the present invention for accelerating an oxygen reduction reaction, contains: silver or palladium as a core material; and platinum as a shell material, the core-shell catalyst having, on a surface thereof, a (110) surface of a face centered cubic lattice.

A reaction acceleration method in accordance with an embodiment of the present invention for accelerating an oxygen reduction reaction by use of a (110) surface that is formed on a surface of a core-shell catalyst containing: silver or palladium as a core material; and platinum as a shell material, the reaction acceleration method includes: molecularly adsorbing an oxygen molecule onto the (110) surface; forming a water molecule by causing (i) the oxygen molecule adsorbed onto the (110) surface and (ii) a proton to react with each other; and desorbing the water molecule from the (110) surface.

Advantageous Effects of Invention

According to a core-shell catalyst of an embodiment of the present invention and a reaction acceleration method in which the core-shell catalyst is used, silver or palladium is used as a core material, platinum is used as a shell material, and the core-shell catalyst has, on a surface thereof, a (110) surface of a face centered cubic lattice. This makes it possible to provide (i) a catalyst that has a core-shell structure and is highly active in an oxygen reduction reaction, which is a cathode reaction of a fuel cell, and (ii) a reaction acceleration method in which the catalyst is used.

BRIEF DESCRIPTION OF DRAWINGS

FIG. 9 is a chart showing lattice constants of each of platinum, silver, and palladium.

Figure 11:
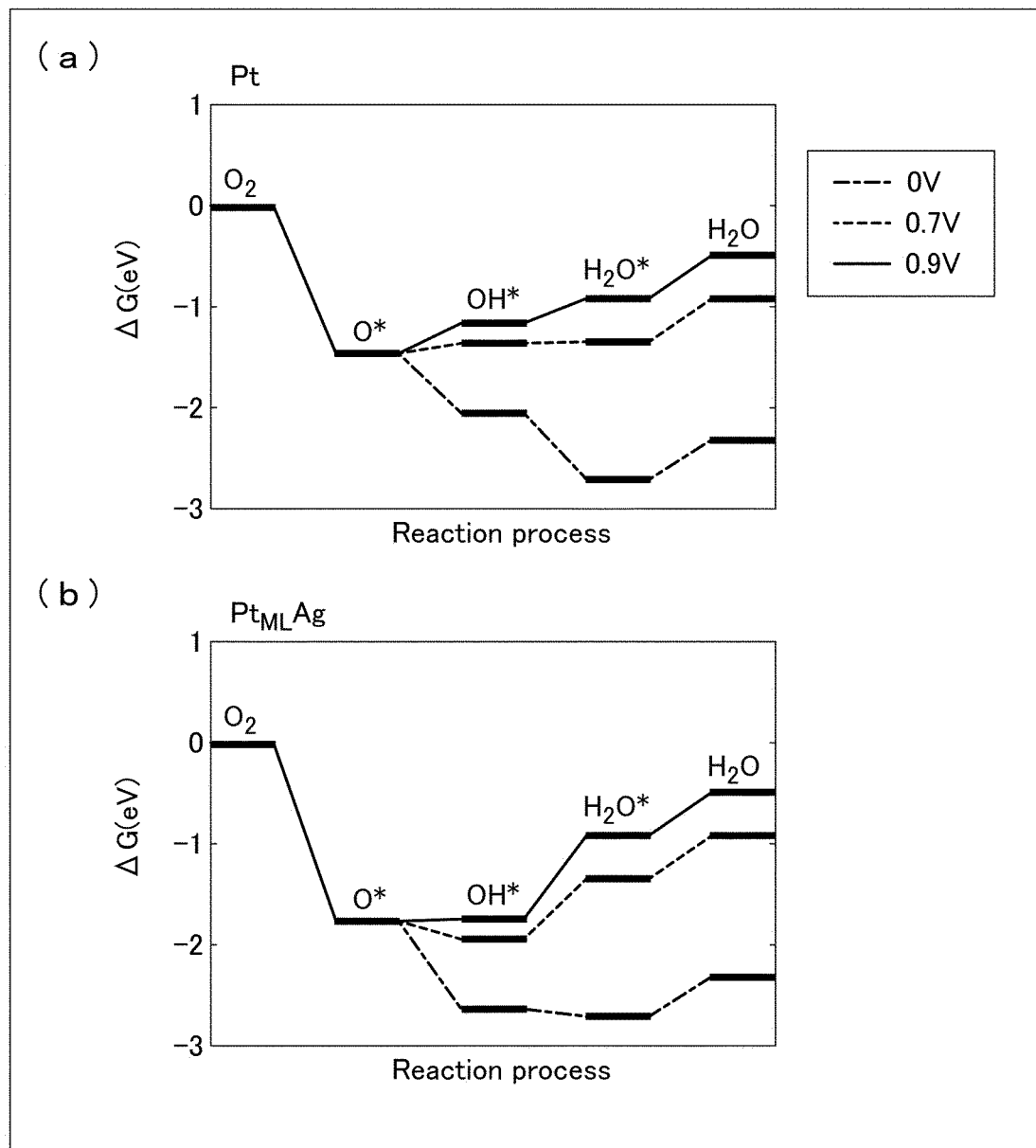

(a) and (b) of FIG. 11 each show a change in free energy obtained in each state in the oxygen reduction reaction which includes the step of oxygen molecule dissociation.

Figure 12:
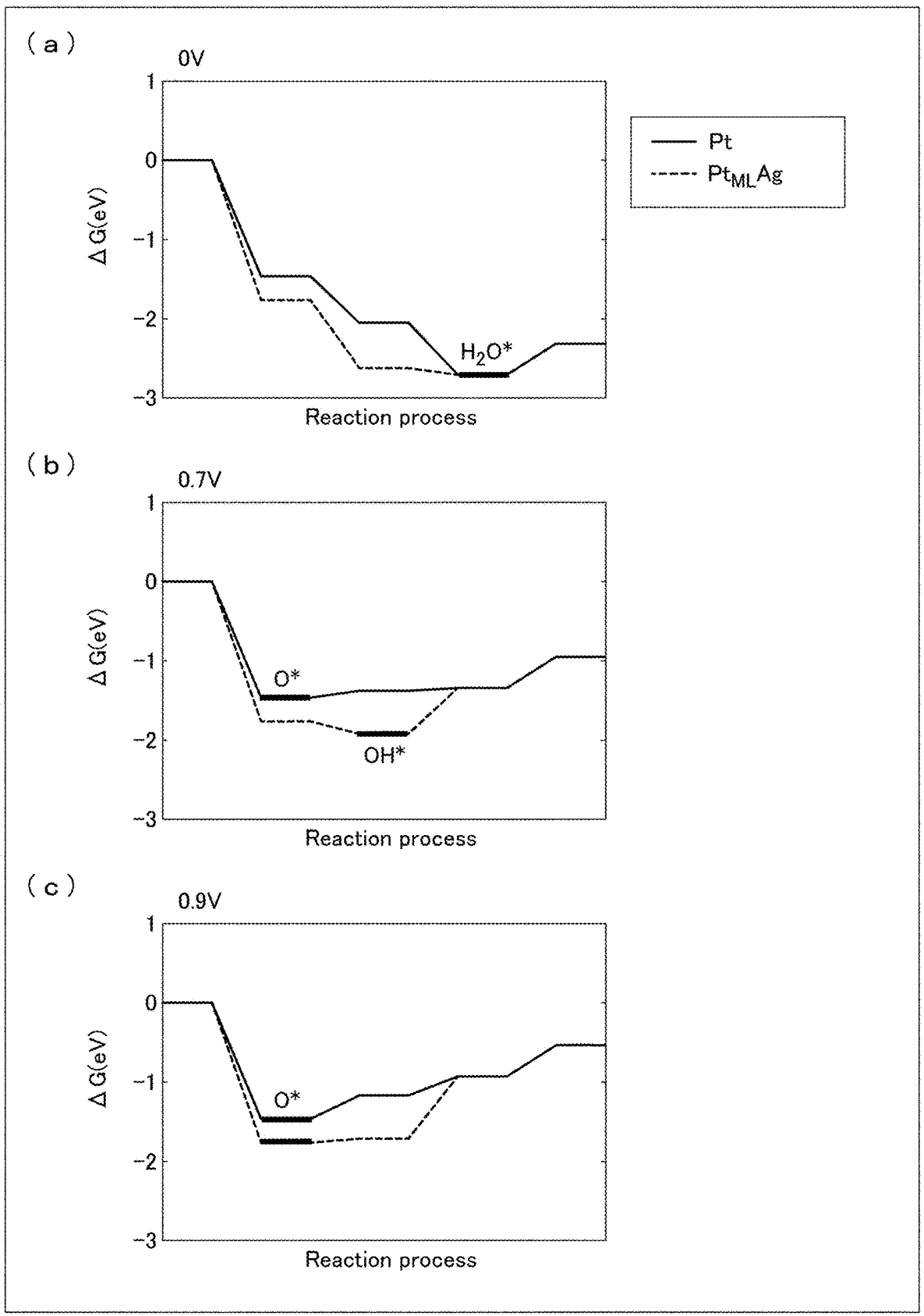

(a) through (c) of FIG. 12 show, for each electric potential applied, the changes, shown in (a) and (b) of FIG. 11, in free energy obtained in each state in the oxygen reduction reaction in which Pt and $Pt_{ML}Ag$ are used as catalysts.

FIG. 13 is a chart showing potential energy obtained in a state in which OOH is adsorbed onto a Pt surface.

FIG. 14 has views each illustrating a state in which OOH is adsorbed onto a Pt surface. (a) of FIG. 14 illustrates a state in which OOH is adsorbed onto the Top site of the Pt surface. (b) of FIG. 14 illustrates a state in which OOH is adsorbed onto the S-bridge site of the Pt surface.

FIG. 15 is a view illustrating a state into which each of the states of (a) and (b) of FIG. 14 has been changed by further adsorption of a proton onto the Pt surface.

FIG. 16 is a view illustrating a state into which the state illustrated in FIG. 15 has been changed by further adsorption of a proton onto the Pt surface.

Figure 17:
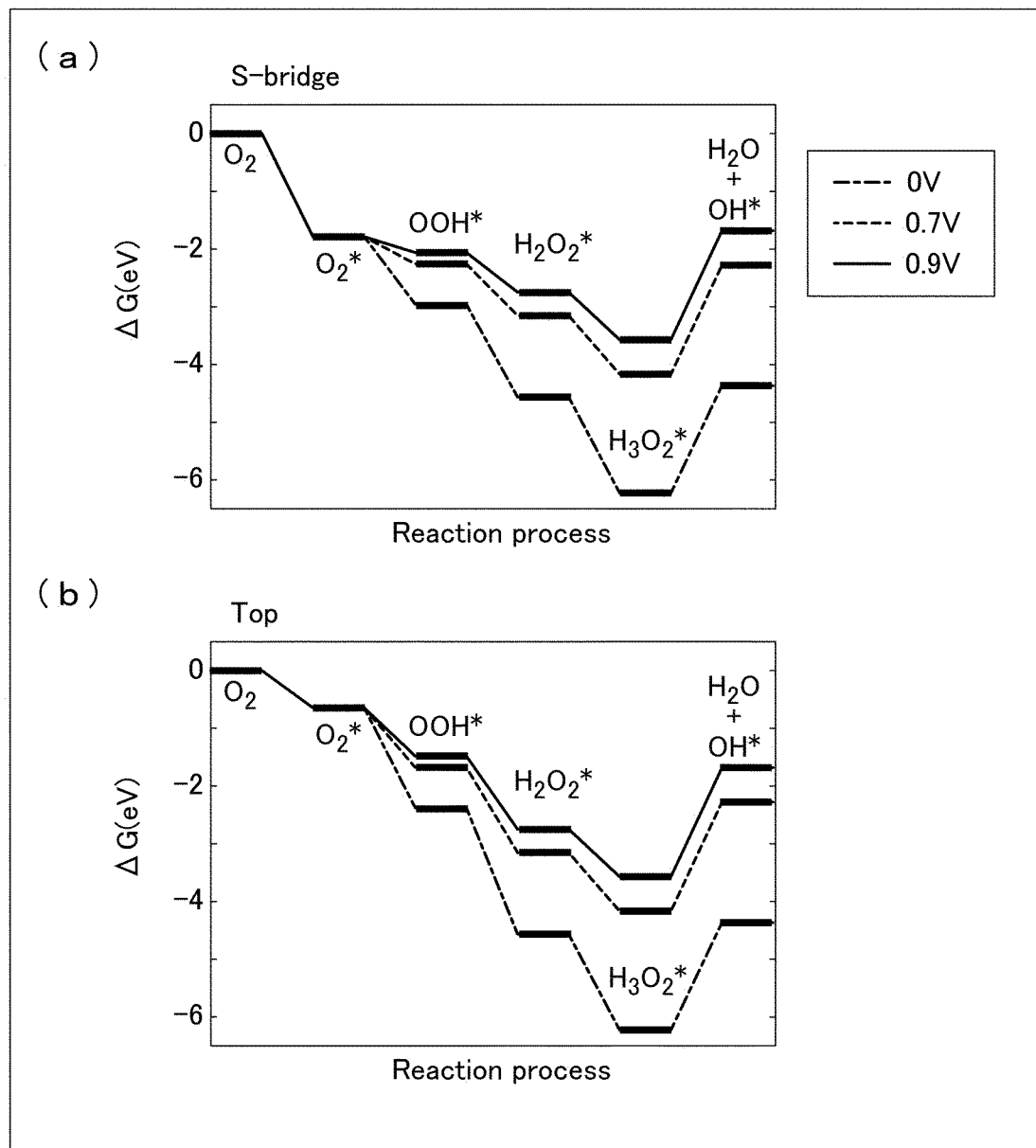

(a) and (b) of FIG. 17 show a change in free energy obtained in each state in the oxygen reduction reaction which includes no step of oxygen molecule dissociation and in which Pt is used as a catalyst.

Figure 18:
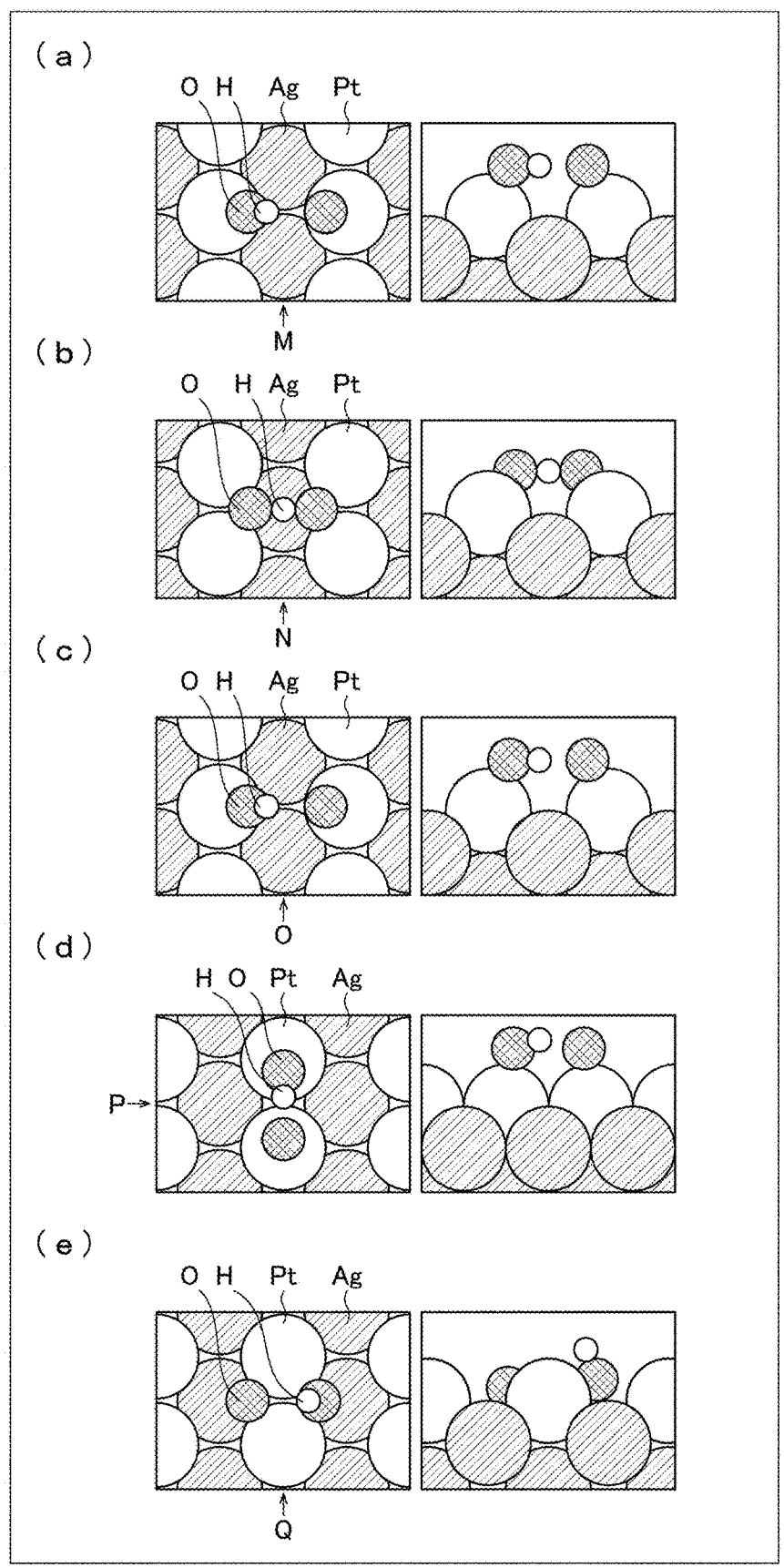

(a) through (e) of FIG. 18 are views each illustrating a state in which OOH is adsorbed onto a $Pt_{ML}Ag$ surface.

Figure 19:
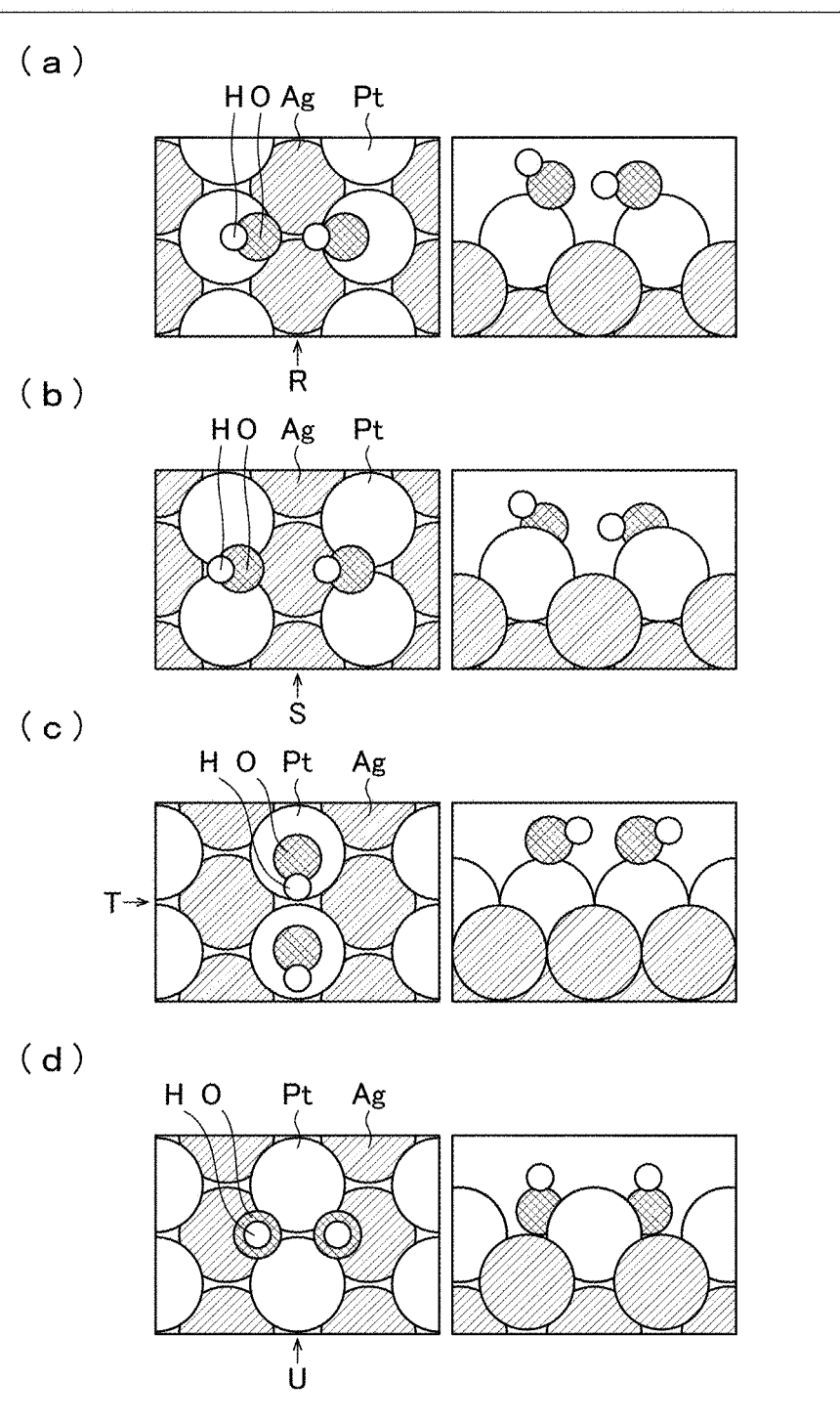

(a) through (d) of FIG. 19 are views each illustrating a state in which $H_2O_2$ is adsorbed onto the $Pt_{ML}Ag$ surface.

Figure 20:
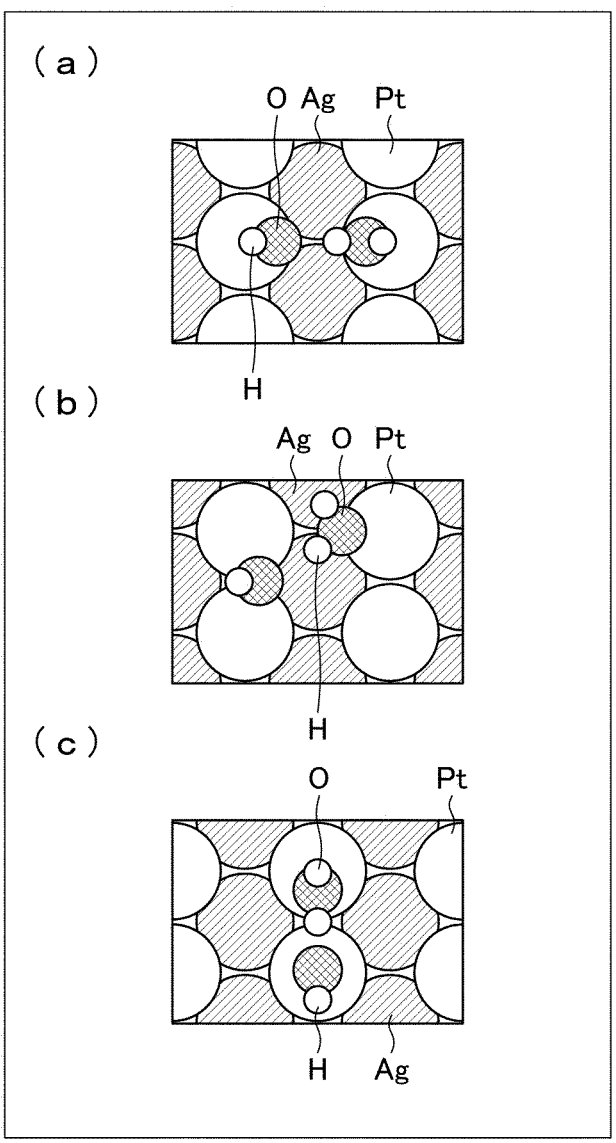

(a) through (c) of FIG. 20 are views each illustrating a state in which $H_3O_2$ is adsorbed onto the $Pt_{ML}Ag$ surface.

Figure 8:
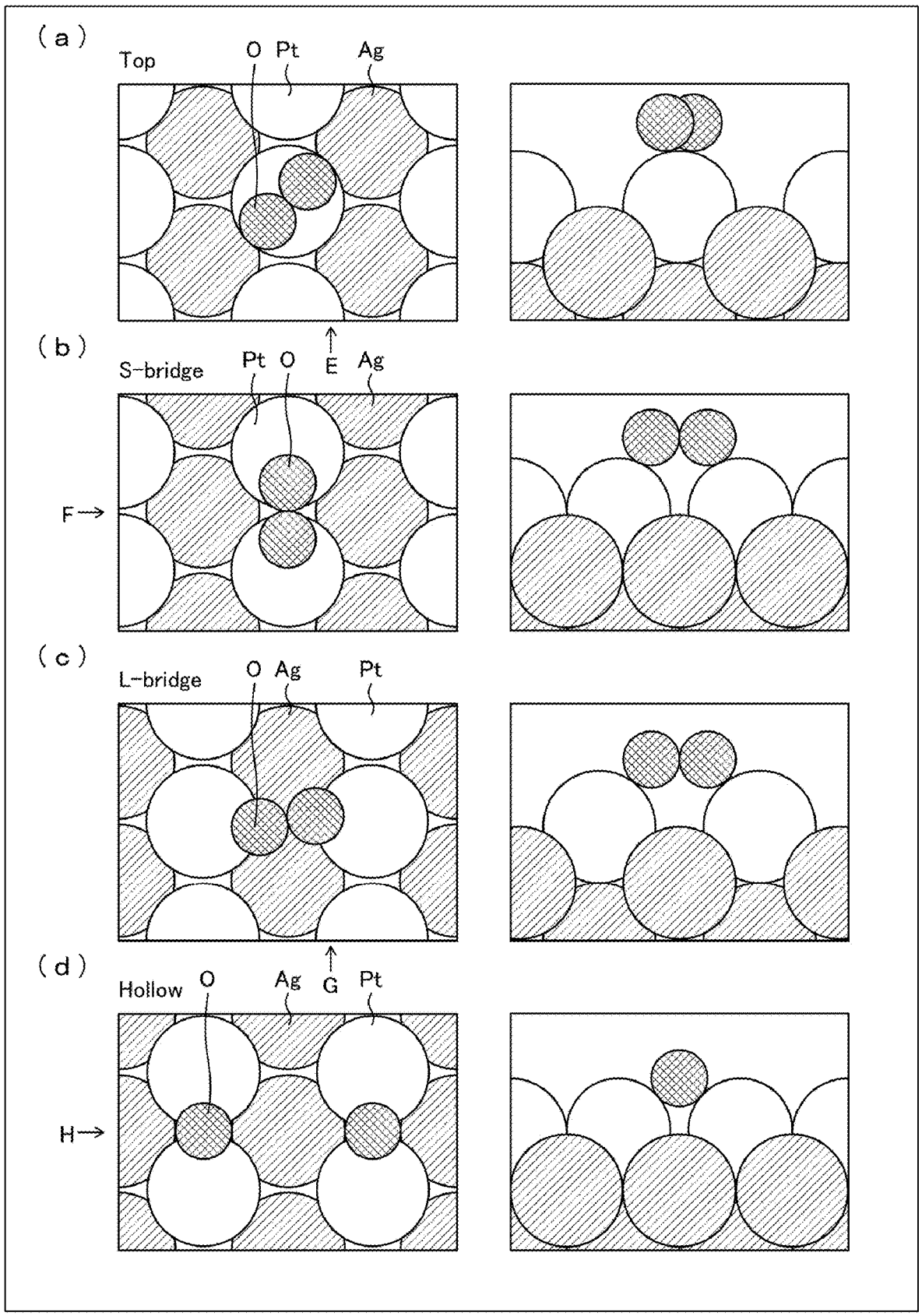
FIG. 8 has views each illustrating how an oxygen molecule is adsorbed onto a $Pt_{ML}Ag$ surface with the adsorption energy shown in FIG. 6. (a) through (d) of FIG. 8 are views illustrating how oxygen molecules are adsorbed onto the Top site, the S-bridge site, the L-bridge site, and the Hollow site, respectively, of the $Pt_{ML}Ag$ surface.
Figure 21:
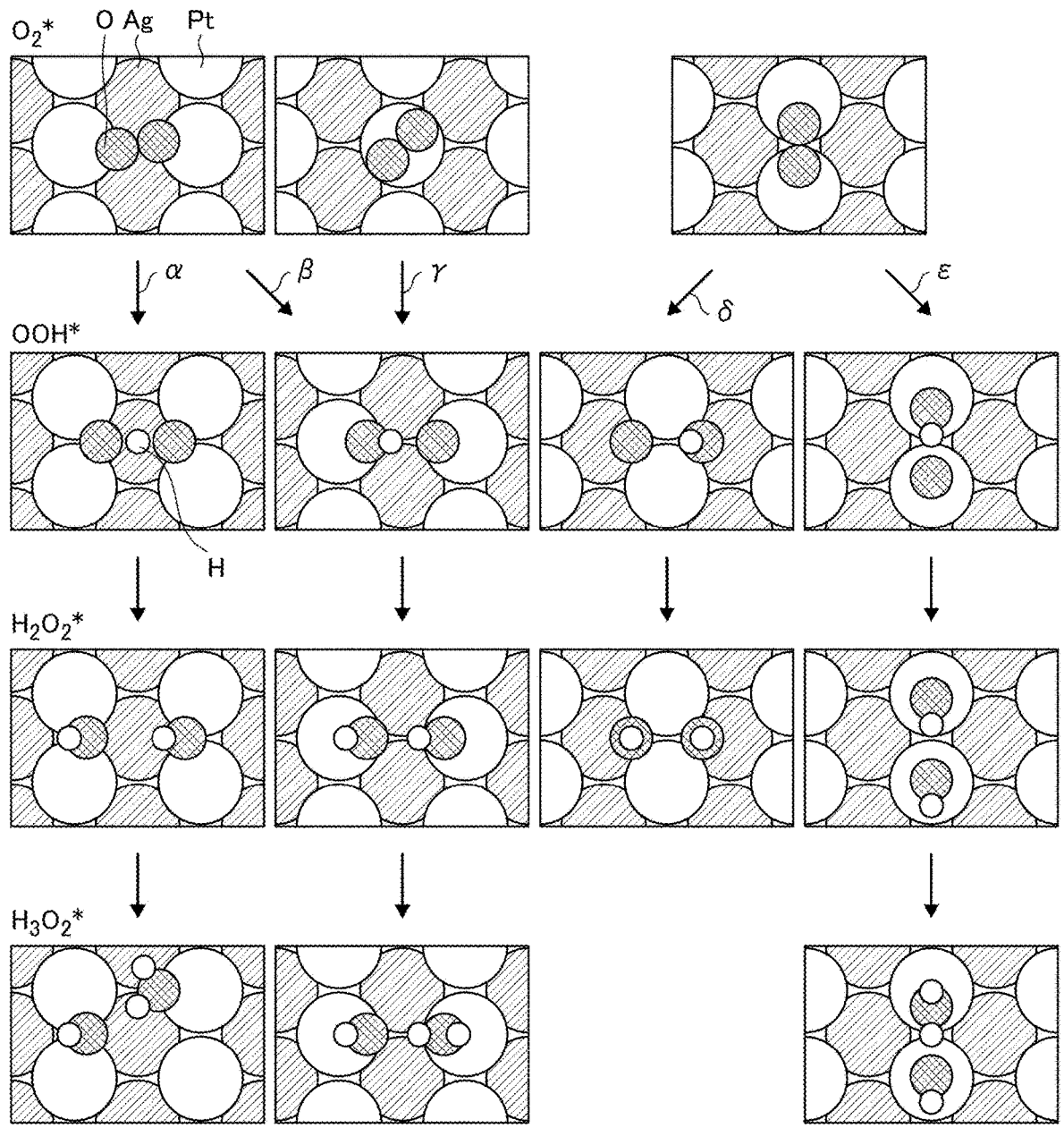

FIG. 21 is a diagram showing a transition, made by a process of the oxygen reduction reaction which includes no step of oxygen molecule dissociation and in which $Pt_{ML}Ag$ is used, from the states illustrated in (a) through (c) of FIG. 8 to the states illustrated in FIGS. 18 through 20.

Figure 22:
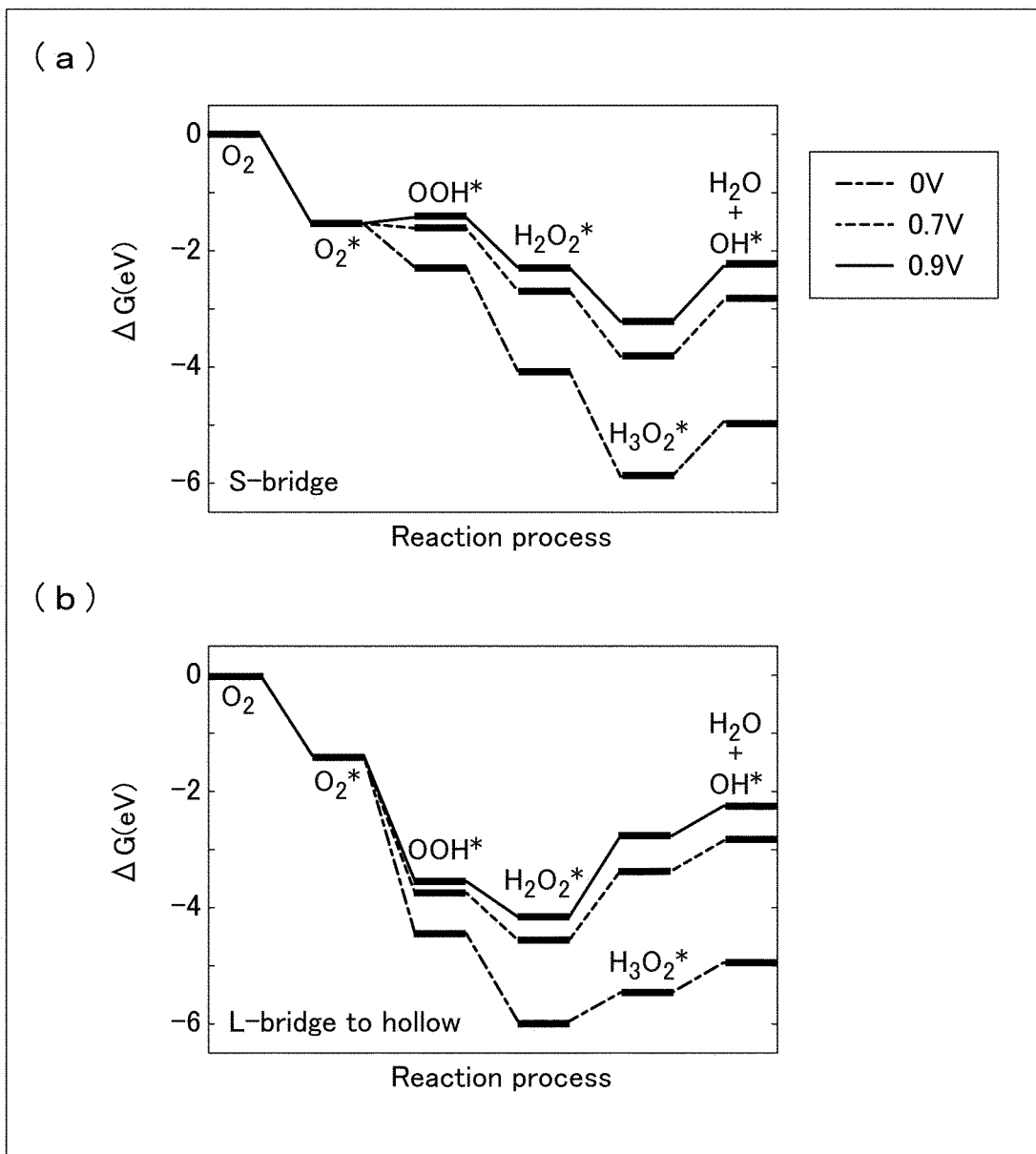

(a) and (b) of FIG. 22 show a change in free energy obtained in the oxygen reduction reaction which includes no step of oxygen molecule dissociation and in which $Pt_{ML}Ag$ is used as a catalyst.

Figure 23:
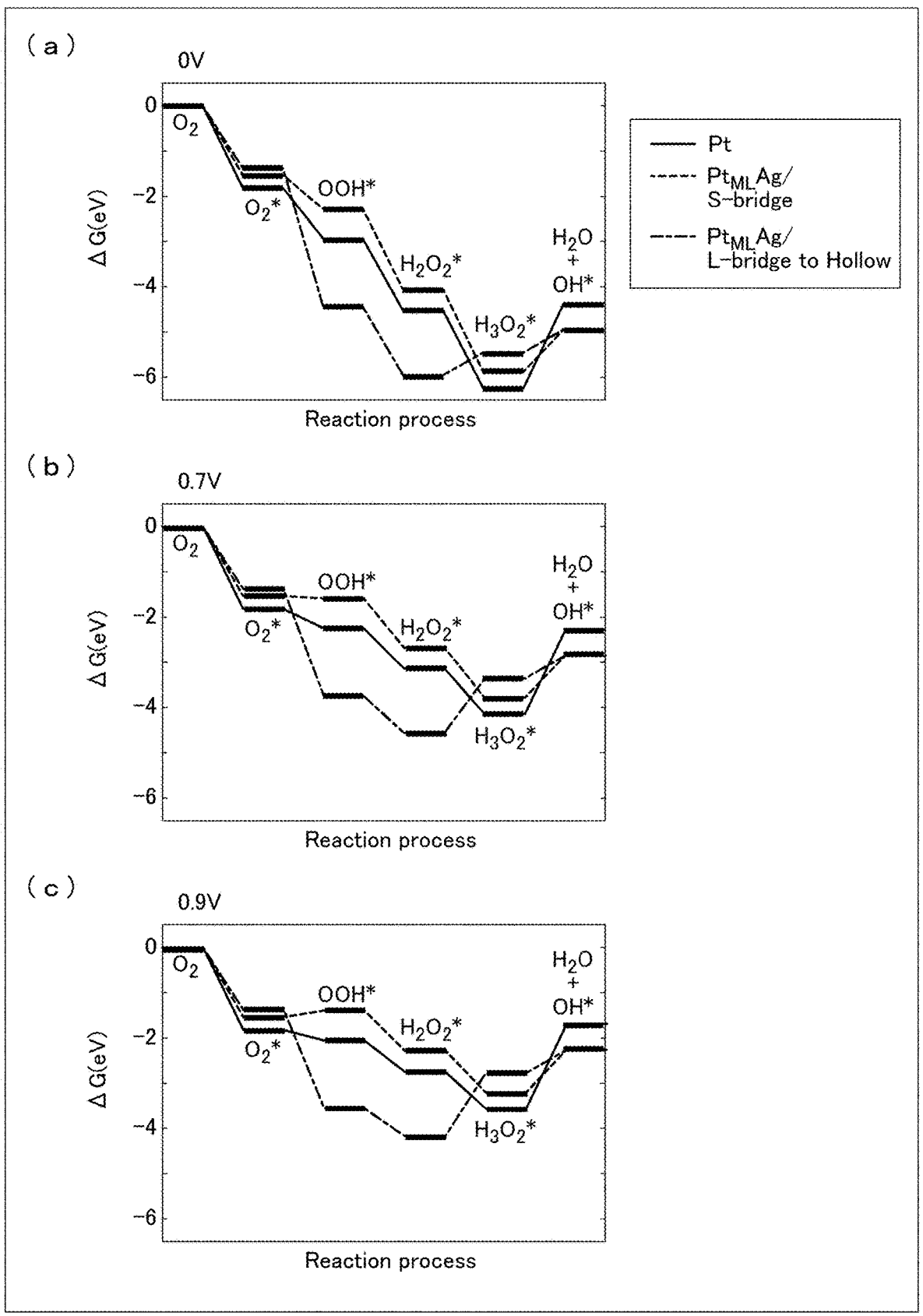

(a) through (c) of FIG. 23 show, for each electric potential applied, the changes in free energy, which changes are shown in FIGS. 17 and 22.

DESCRIPTION OF EMBODIMENTS

An embodiment of the present invention is specifically described below.

A core-shell catalyst which is an embodiment of the present invention and which contains silver or palladium as a core material and contains platinum as a shell material is a catalyst for accelerating an oxygen reduction reaction that is caused in, for example, a cathode of a fuel cell. Note that the core material is preferably silver or palladium.

In order to evaluate catalytic activity of a core-shell catalyst containing silver or palladium as a core material and containing platinum as a shell material, the inventors of the present invention carried out a simulation in which first-principles calculation based on density functional theory was used. Note that the first-principles calculation is a calculation method based on the density functional theory showing that "ground-state energy of many-electron systems that interact with each other is determined in accordance with a density distribution of electrons" (see P. Hohenberg and W. Kohn, Phys. Rev. 136, B864 (1964), W. Kohn and L. J. Sham, Phys. Rev. 140, A1133 (1965), or Chapter 3 of "Kotai Denshi Kouzou [Solid-state Electronic Structure]" written by Takeo FUJIWARA, published by Asakura Publishing, Co., Ltd.). The first-principles calculation makes it possible to quantitatively discuss an electronic structure of a substance without an empirical parameter. Actually, the first-principles calculation allows effectiveness equivalent to that shown by experiments to be shown by many verifications. In the present simulation, a general density gradient approximation method, which is currently the most accurate one of the first-principles calculations, was used to carry out calculation.

In the present simulation, calculation was carried out with respect to not only a core-shell catalyst containing silver as a core material and containing platinum as a shell material (this catalyst is hereinafter referred to as "$Pt_{ML}Ag$") and a core-shell catalyst containing palladium as a core material and containing platinum as a shell material (this catalyst is hereinafter referred to as "$Pt_{ML}Pd$") but also, for comparison, a catalyst consisting solely of platinum (this catalyst is hereinafter referred to as "Pt"). The simulation was carried out under a condition that each of the catalysts was a catalyst including 6 atomic layers. $Pt_{ML}Ag$ had a structure in which a single atomic layer of Pt was provided on 5 atomic layers of Ag, and $Pt_{ML}Pd$ had a structure in which a single atomic layer of Pt was provided on 5 atomic layers of Pd. Note that a core-shell catalyst can include, as shell layer(s), not only a single atomic layer of platinum but also 1 to 3 atomic layers of platinum.

(1. Oxygen Reduction Reaction)

Prior to evaluation of catalytic activity, first, the following description discusses an oxygen reduction reaction, which is a cathode reaction of a fuel cell.

Known examples of a reaction model of the oxygen reduction reaction include the following three reaction models: a reaction model in which the oxygen reduction reaction proceeds through the step of (1) oxygen molecule dissociation (oxygen dissociation); a reaction model in which the oxygen reduction reaction proceeds through the step of (2) peroxyl dissociation; and a reaction model in which the oxygen reduction reaction proceeds through the step of (3) hydrogen peroxide dissociation.

Figure 1:
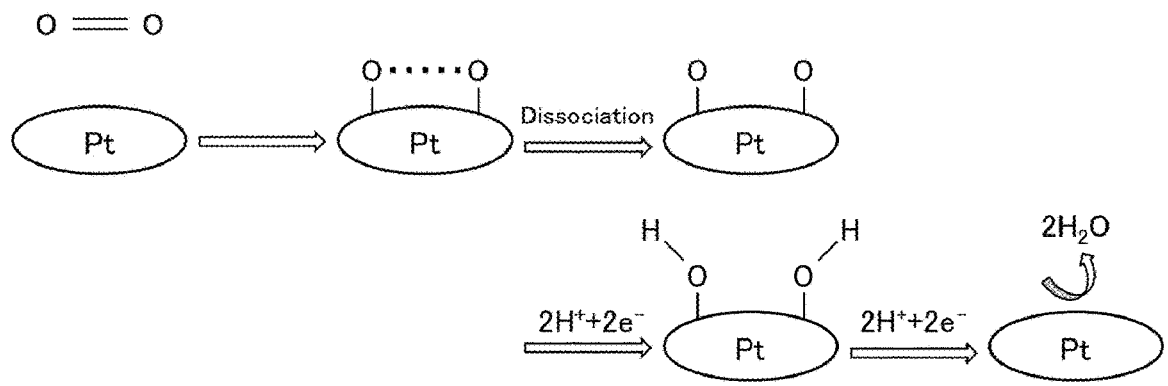
FIG. 1 is a view illustrating a reaction model of the oxygen reduction reaction which reaction model includes a step of oxygen molecule dissociation.

FIG. 1 is a view illustrating a reaction model of the oxygen reduction reaction which reaction model includes the step of oxygen molecule dissociation. As illustrated in FIG. 1, in the step of oxygen molecule dissociation, an oxygen molecule is adsorbed onto a catalytic surface first ($O_2 + * \rightarrow O_2^*$). Note that the sign "*" means the catalytic surface, and $O_2^*$ means that the oxygen molecule is adsorbed onto the catalytic surface. Next, the oxygen molecule which has been adsorbed onto the catalytic surface is dissociated into oxygen atoms ($O_2^* + * \rightarrow *O^* + O^*$). Then, a proton ($H^+$) having been moved from the anode side through an electrolyte and an oxygen atom on the catalytic surface react with each other, so that OH is formed on the catalytic surface ($O^* + H^+ + e^- \rightarrow OH^*$). Finally, OH on the catalytic surface and a proton react with each other, so that water is generated and desorbed from the catalytic surface ($OH^* + H^+ + e^- \rightarrow H_2O$).

Figure 2:
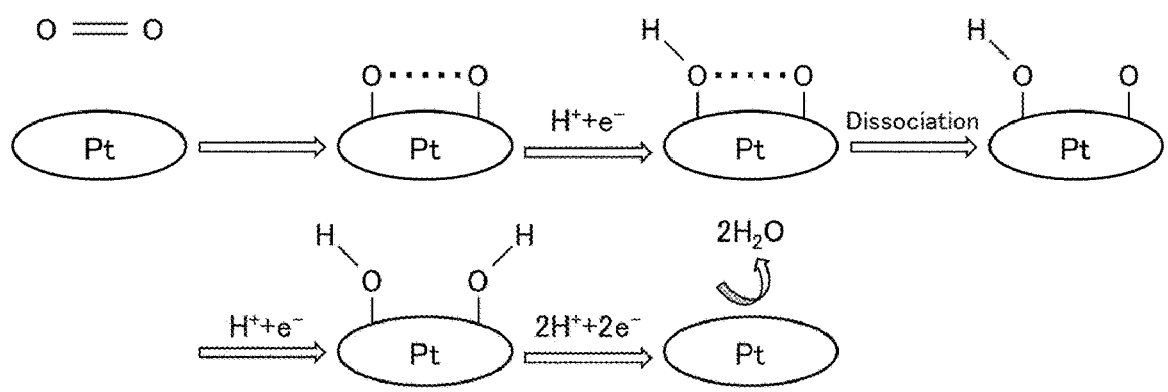
FIG. 2 is a view illustrating a reaction model of the oxygen reduction reaction which reaction model includes a step of peroxyl dissociation.

FIG. 2 is a view illustrating a reaction model of the oxygen reduction reaction which reaction model includes the step of peroxyl dissociation. As illustrated in FIG. 2, also in the step of peroxyl dissociation, an oxygen molecule is adsorbed onto a catalytic surface first ($O_2+* \rightarrow *O_2*$) as in the case of the step of oxygen molecule dissociation. Next, a proton having been moved from the anode side through an electrolyte and the oxygen molecule on the catalytic surface react with each other, so that OOH is formed on the catalytic surface ($O_2*+H^++e^- \rightarrow OOH*$). Then, OOH is dissociated into an oxygen atom and OH ($OOH* \rightarrow O*+OH*$). Subsequently, the oxygen atom on the catalytic surface and a proton react with each other, so that OH is formed ($O*+H^++e^- \rightarrow OH*$). Thereafter, OH on the catalytic surface and a proton react with each other, so that water is generated and desorbed from the catalytic surface ($OH*+H^++e^- \rightarrow H_2O$).

Figure 3:
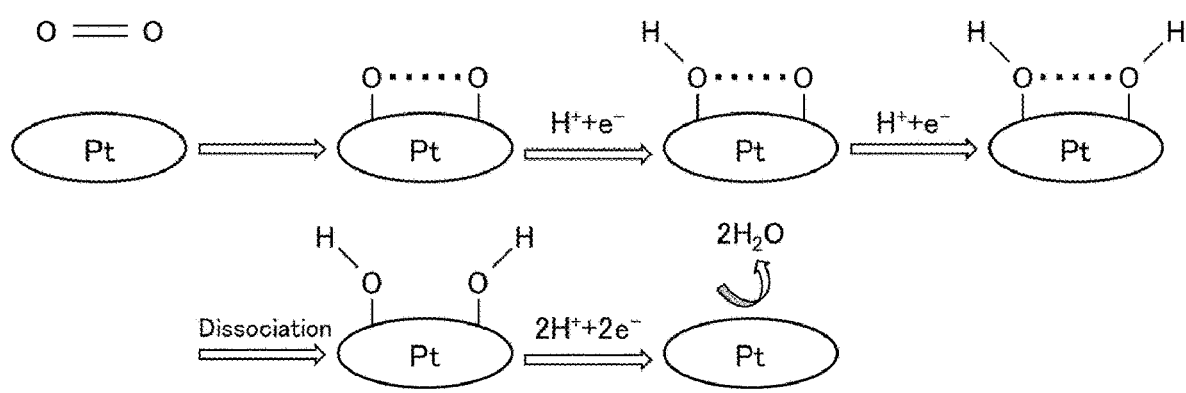
FIG. 3 is a view illustrating a reaction model of the oxygen reduction reaction which reaction model includes a step of hydrogen peroxide dissociation.

FIG. 3 is a view illustrating a reaction model of the oxygen reduction reaction which reaction model includes the step of hydrogen peroxide dissociation. As illustrated in FIG. 3, also in the step of hydrogen peroxide dissociation, an oxygen molecule is adsorbed onto a catalytic surface first ($O_2+* \rightarrow *O_2*$) as in the case of the step of oxygen molecule dissociation. Next, a proton having been moved from the anode side through an electrolyte and the oxygen molecule on the catalytic surface react with each other, so that OOH is formed ($O_2*+H^++e^- \rightarrow OOH*$). Subsequently, OOH on the catalytic surface and a proton react with each other, so that $H_2O_2$ is formed on the catalytic surface ($OOH*+H^++e^- \rightarrow H_2O_2*$). Thereafter, $H_2O_2$ on the catalytic surface is dissociated into two OH ($H_2O_2* \rightarrow OH*+OH*$), and OH on the catalytic surface and a proton react with each other, so that water is generated and desorbed from the catalytic surface ($OH*+H^++e^- \rightarrow H_2O$).

As described earlier, an oxygen molecule is adsorbed onto a catalytic surface first in any of the reaction models of the oxygen reduction reaction which reaction models include the respective steps of oxygen molecule dissociation, peroxyl dissociation, and hydrogen peroxide dissociation.

Note here that silver, platinum, and palladium each have a face centered cubic (FCC) structure. A (110) surface of the FCC structure and a surface of the FCC structure which surface is equivalent to the (110) surface have a lower in-plane atom density than the other surfaces (e.g., a (100) surface and a (111) surface) of the FCC structure. Thus, oxygen molecule adsorption, which is a first stage of the oxygen reduction reaction, is considered to be more likely to occur in the (110) surface than in the other surfaces. In view of this, the following description discusses the simulation which is carried out while attention is focused on the (110) surface, which is considered to have high reaction activity.

(2. Adsorption of Oxygen Atom)

First, a case where an oxygen atom is adsorbed onto a catalytic surface is to be discussed before oxygen molecule adsorption, which is the first stage of the oxygen reduction reaction, is discussed.

Figures 4, 5, 6:
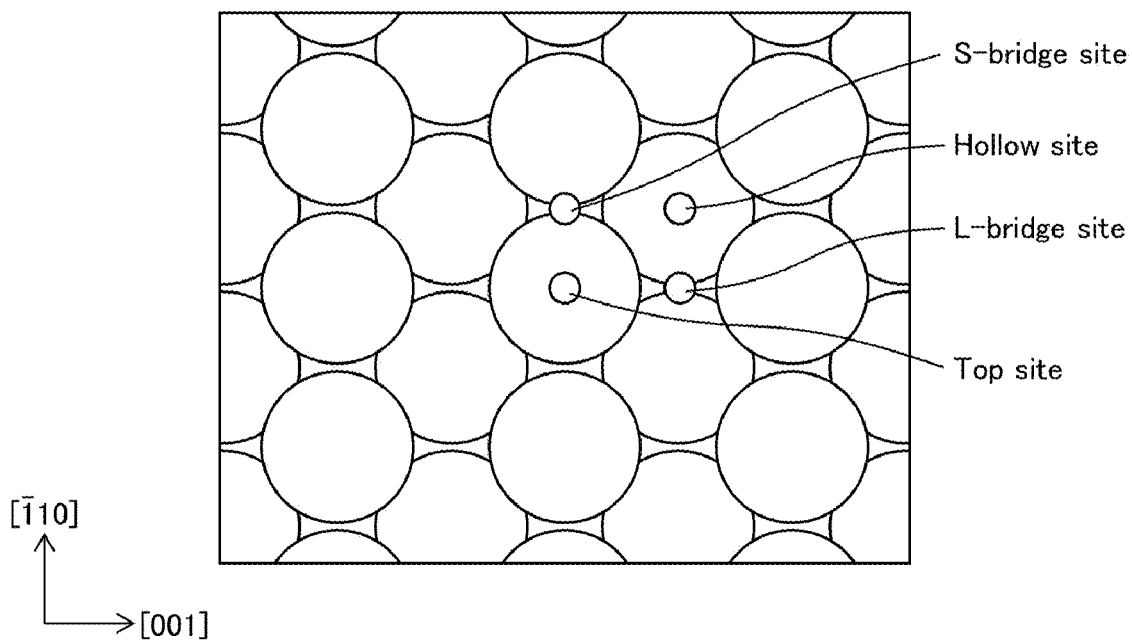
FIG. 4 is a view of a (110) surface of an FCC structure, the (110) surface being seen from a direction normal to the (110) surface.
FIG. 5 is a chart showing adsorption energy with which an oxygen atom is adsorbed onto adsorption sites of each of Pt, $Pt_{ML}Ag$, and $Pt_{ML}Pd$.
FIG. 6 is a chart showing adsorption energy with which an oxygen molecule is adsorbed onto the adsorption sites of each of Pt, $Pt_{ML}Ag$, and $Pt_{ML}Pd$.

FIG. 4 is a view of a (110) surface of an FCC structure, the (110) surface being seen from a direction normal to the (110) surface. As illustrated in FIG. 4, in the case of a catalyst having, on a surface thereof, the (110) surface of the FCC structure, a total of four sites, which are an On-top (hereinafter, Top) site, a Short bridge (hereinafter, S-bridge) site, a Long bridge (hereinafter, L-bridge) site, and a Hollow site, is assumed as adsorption sites of an oxygen atom.

The Top site is an adsorption site that is present on an atom of a first layer of a catalytic surface. Note here that according to the (110) surface of the FCC structure, a [−110] direction, which is an in-plane direction, and a [001] direction, which is also an in-plane direction, differ in interatomic distance, and the [−110] direction is shorter in interatomic distance than the [001] direction. The S-bridge site is an adsorption site that is present between atoms located in the direction ([−110] direction), which is shorter in interatomic distance. The L-bridge site is an adsorption site that is present between atoms located in the direction ([001] direction), which is longer in interatomic distance. The Hollow site is an adsorption site that is present so as to be surrounded by four atoms. Note that the sign "−", which is supposed to be given above a numeral indicative of a direction in writing in crystallography, is to be given before the numeral for convenience in writing.

Assuming here that a difference ($\Delta E = E - E_0$) between energy ($E_0$) with which an oxygen atom is present at an infinite distance from a catalytic surface and energy (E) with which the oxygen atom is adsorbed onto the catalytic surface is adsorption energy, the adsorption energy of the oxygen atom is found with respect to each of the adsorption sites.

FIG. 5 is a chart showing a result of calculation of adsorption energy with which an oxygen atom is adsorbed onto the adsorption sites of each of Pt, $Pt_{ML}Ag$, and $Pt_{ML}Pd$. As shown in FIG. 5, the S-bridge site of any of Pt, $Pt_{ML}Ag$, and $Pt_{ML}Pd$ has minimum adsorption energy. This reveals that an oxygen atom that is adsorbed onto a catalytic surface is stably adsorbed onto the S-bridge site in any of the cases of Pt, $Pt_{ML}Ag$, and $Pt_{ML}Pd$.

(3. Adsorption of Oxygen Molecule)

Next, a case where an oxygen molecule is adsorbed onto a catalytic surface is to be discussed. According to a catalyst having, on a surface thereof, a (110) surface of an FCC structure, as in the case where an oxygen atom is adsorbed onto a catalytic surface, the Top site, the S-bridge site, the L-bridge site, and the Hollow site are also assumed as adsorption sites also in the case where an oxygen molecule is adsorbed onto a catalytic surface. Note here that for example, a state in which an oxygen molecule is adsorbed onto the Top site means a state in which a center of gravity of the oxygen molecule is located at the Top site, i.e., means a state in which a midpoint of respective centers of gravity of two oxygen atoms is located at the Top site.

Assuming here that a difference ($\Delta E = E - E_0$) between energy ($E_0$) with which an oxygen molecule is present at an infinite distance from a catalytic surface and energy (E) with which the oxygen molecule is adsorbed onto the catalytic surface is adsorption energy, the adsorption energy of the oxygen atom is found with respect to each of the adsorption sites.

FIG. 6 is a chart showing a result of calculation of adsorption energy with which an oxygen molecule is adsorbed onto the adsorption sites of each of Pt, $Pt_{ML}Ag$, and $Pt_{ML}Pd$. Note that as described earlier, a state in which an oxygen molecule is adsorbed onto a certain site means a state in which a center of gravity of the oxygen molecule is present at the certain site. Thus, there may be an indefinite number of patterns of a location of an oxygen molecule with respect to a single site. Note, however, that FIG. 6 shows a location of an oxygen atom that has minimum adsorption energy as a result of calculation (is stably adsorbed), and same applies to the drawings following FIG. 6.

As shown in FIG. 6, the L-bridge site, the Hollow site, the S-bridge site, and the Top site of each of Pt and $Pt_{ML}Pd$ are arranged in an ascending order of adsorption energy, and Pt and $Pt_{ML}Pd$ show identical tendencies. In contrast, the Hollow site, the S-bridge site, the L-bridge site, and the Top site of $Pt_{ML}Ag$ are arranged in an ascending order of adsorption energy. Specifically, the L-bridge site of each of Pt and $Pt_{ML}Pd$ is stable as an adsorption site of an oxygen molecule, whereas the Hollow site of $Pt_{ML}Ag$ is stable as an adsorption site of an oxygen molecule.

Figure 7:
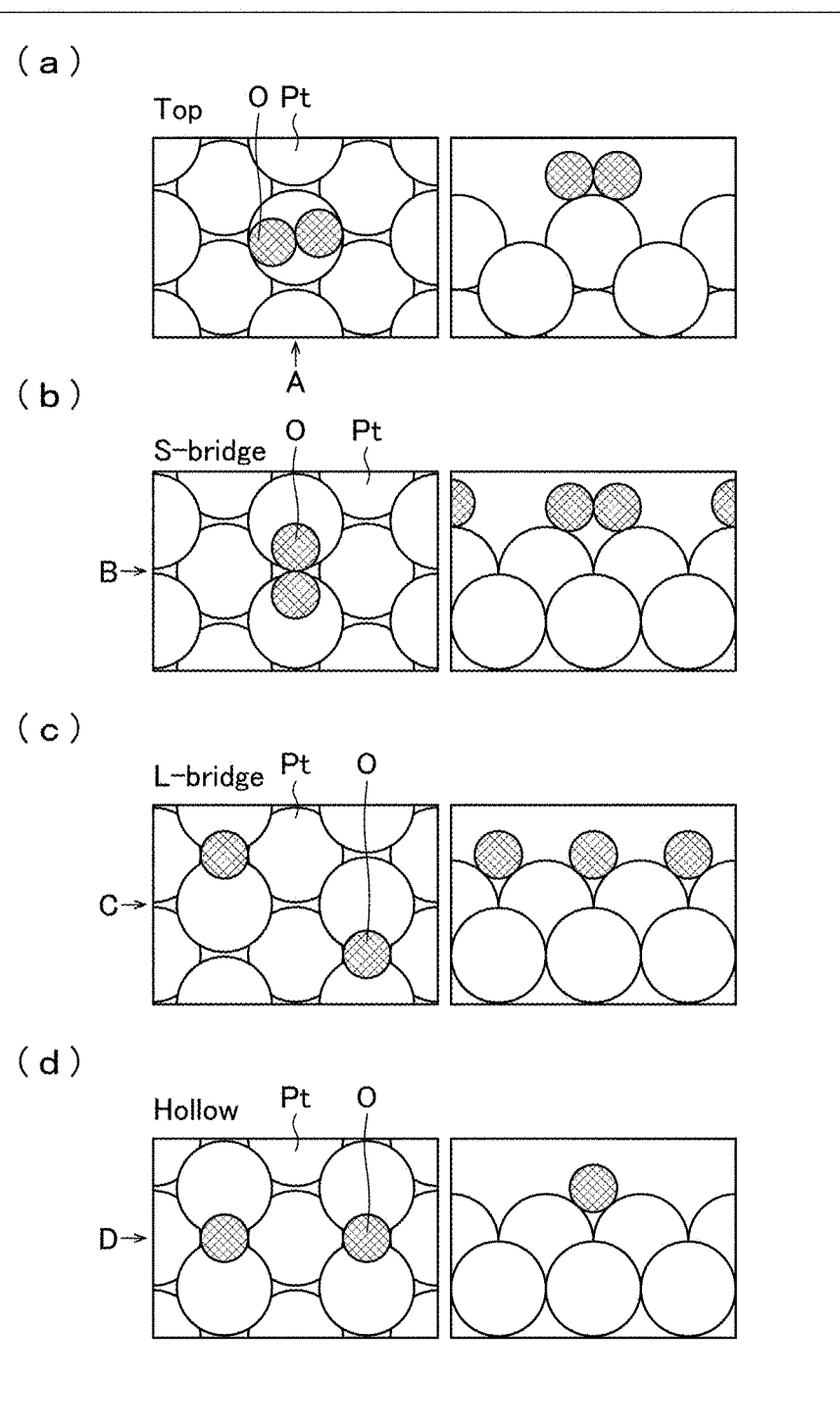
FIG. 7 has views each illustrating how an oxygen molecule is adsorbed onto a Pt surface with the adsorption energy shown in FIG. 6. (a) through (d) of FIG. 7 are views illustrating how oxygen molecules are adsorbed onto a Top site, an S-bridge site, an L-bridge site, and a Hollow site, respectively, of the Pt surface.

FIG. 7 has views each illustrating how an oxygen molecule is adsorbed onto a Pt surface with the adsorption energy shown in FIG. 6. (a) through (d) of FIG. 7 are views illustrating how oxygen molecules are adsorbed onto the Top site, the S-bridge site, the L-bridge site, and the Hollow site, respectively, of the Pt surface. In each of (a) through (d) of FIG. 7, the drawing on the left is a top view of the Pt surface which is seen from above, and the drawing on the right is a cross-sectional view of the drawing on the left which drawing is seen from a corresponding one of an arrow A direction through an arrow D direction.

In FIG. 7, the Top site has a distance between oxygen atoms of 1.37 Å, the S-bridge site has a distance between oxygen atoms of 1.38 Å, the L-bridge site has a distance between oxygen atoms of 4.88 Å, and the Hollow site has a distance between oxygen atoms of 4.00 Å. This reveals that an oxygen molecule that is adsorbed onto the Top site or the S-bridge site of Pt is adsorbed in a molecular state (molecularly adsorbed) and an oxygen molecule that is adsorbed onto the L-bridge site or the Hollow site of Pt is adsorbed while being dissociated into oxygen atoms.

FIG. 8 has views each illustrating how an oxygen molecule is adsorbed onto a $Pt_{ML}Ag$ surface with the adsorption energy shown in FIG. 6. (a) through (d) of FIG. 8 are views illustrating how oxygen molecules are adsorbed onto the Top site, the S-bridge site, the L-bridge site, and the Hollow site, respectively, of the $Pt_{ML}Ag$ surface. In each of (a) through (d) of FIG. 8, the drawing on the left is a top view of the $Pt_{ML}Ag$ surface which is seen from above, and the drawing on the right is a cross-sectional view of the drawing on the left which drawing is seen from a corresponding one of an arrow E direction through an arrow H direction.

In FIG. 8, the Top site has a distance between oxygen atoms of 1.33 Å, the S-bridge site has a distance between oxygen atoms of 1.36 Å, the L-bridge site has a distance between oxygen atoms of 1.36 Å, and the Hollow site has a distance between oxygen atoms of 4.19 Å. This reveals that an oxygen molecule that is adsorbed onto the Top site, the S-bridge site, or the L-bridge site of $Pt_{ML}Ag$ is adsorbed in a molecular state and an oxygen molecule that is adsorbed onto the Hollow site of $Pt_{ML}Ag$ is adsorbed while being dissociated into oxygen atoms.

(4. Lattice Constant and State Density)

FIG. 9 is a chart showing lattice constants of each of platinum (Pt), silver (Ag), and palladium (Pd). An upper row of FIG. 9, which upper row is indicative of a result of calculation, shows calculated values of lattice constants calculated by use of first-principles calculation based on density functional theory, and a lower row of FIG. 9, which lower row is indicative of experimental values, shows lattice constants of a bulk material which lattice constants are shown in C. Kittel, Introduction to Solid State Theory (Wiley, New York, 2005). FIG. 9 reveals that a calculated value and an experimental value are highly consistent with each other. Note here that Pt has a lattice constant whose calculated value is 3.977 Å, Ag has a lattice constant whose calculated value is 4.166 Å, and Pd has a lattice constant whose calculated value is 3.957 Å. Further, the calculated value of the lattice constant of Ag is 104.75% of the calculated value of the lattice constant of Pt, and the calculated value of the lattice constant of Pd is 99.5% of the calculated value of the lattice constant of Pt.

Note here that a value of a lattice constant of $Pt_{ML}Ag$ in which one atomic layer of Pt is provided on Ag is considered to show a tendency that is identical to a tendency of a value of a lattice constant of Ag, and a value of a lattice constant of $Pt_{ML}Pd$ in which one atomic layer of Pt is provided on Pd is considered to show a tendency that is identical to a tendency of a value of a lattice constant of Pd. Specifically, the reason why an oxygen molecule is dissociatively adsorbed onto the L-bridge site in each of Pt and $Pt_{ML}Pd$ but is not dissociatively adsorbed onto the L-bridge site in $Pt_{ML}Ag$ seems to be because $Pt_{ML}Ag$, which has a greater lattice constant than Pt and $Pt_{ML}Pd$, is insufficient for the oxygen molecule to be dissociated and adsorbed.

Figure 10:
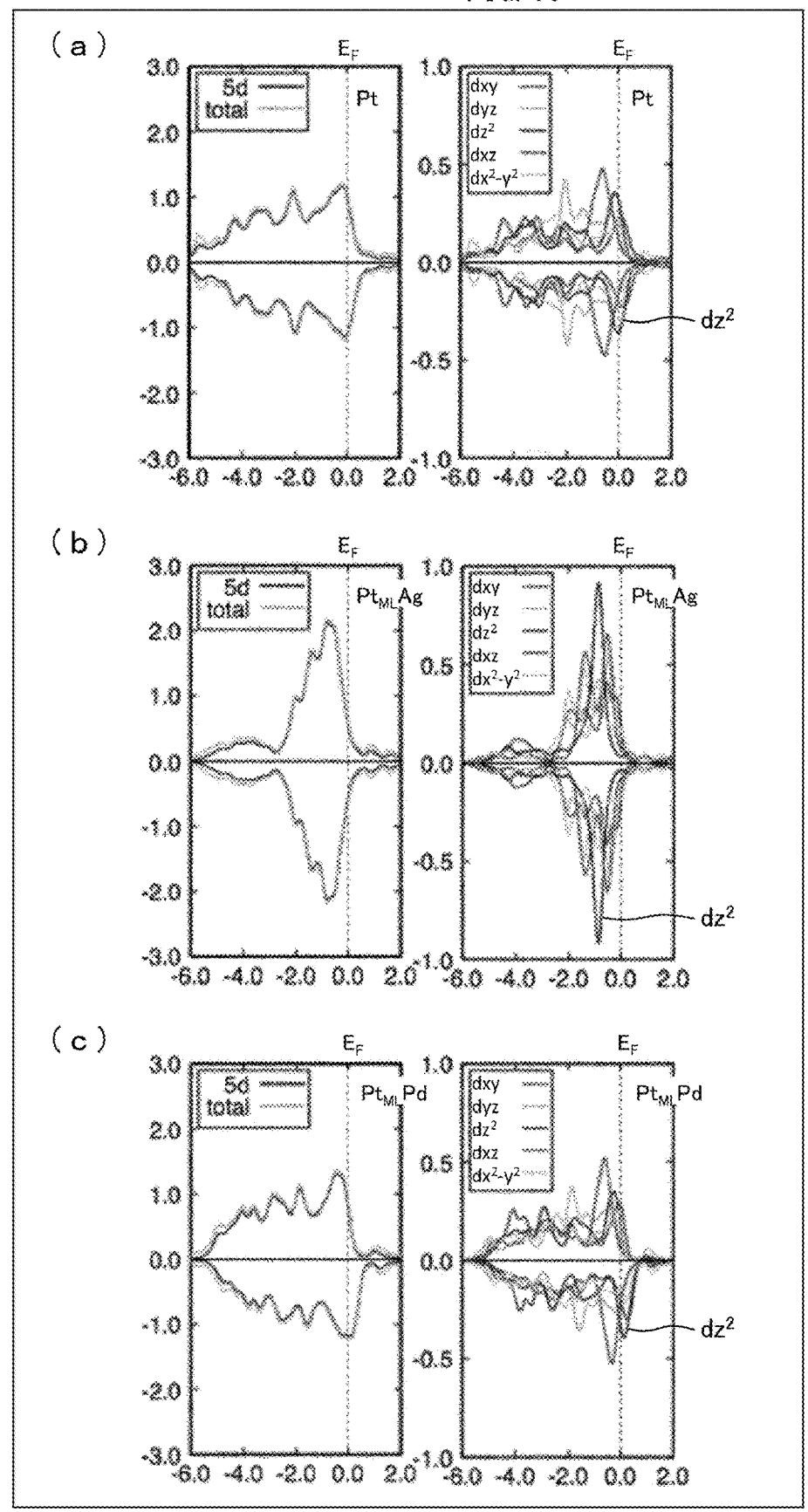
FIG. 10 has charts each showing a state density of a catalytic surface. (a) through (c) of FIG. 10 are charts showing respective state densities of a Pt surface, a $Pt_{ML}Ag$ surface, and a $Pt_{ML}Pd$ surface.

FIG. 10 has charts each showing a state density of a catalytic surface. (a) through (c) of FIG. 10 are charts showing respective state densities of a Pt surface, a $Pt_{ML}Ag$ surface, and a $Pt_{ML}Pd$ surface. In each of (a) through (c) of FIG. 10, the drawing on the left shows a state density (total) of a total of orbitals and a state density (5d) of a 5d orbital, and the drawing on the right shows respective state densities of five 5d orbitals. In each of (a) through (c) of FIG. 10, 0 (zero) on a transverse axis shows Fermi level. As shown in (a) of FIG. 10, Pt has a high electron density near the Fermi level. This reveals that Pt has high catalytic activity. Meanwhile, $Pt_{ML}Pd$ shown in (c) of FIG. 10 has a state density similar to that of Pt. This reveals that $Pt_{ML}Pd$ also has high catalytic activity as in the case of Pt.

Meanwhile, $Pt_{ML}Ag$ shown in (b) of FIG. 10 has a higher electron density near the Fermi level than Pt and $Pt_{ML}Pd$. In particular, as is clear from the drawing on the right of (b) of FIG. 10, $Pt_{ML}Ag$ has a $dz^2$ orbital whose state density further deviates in a negative direction as compared with state densities of $dz^2$ orbitals of Pt and $Pt_{ML}Pd$. In particular, the $dz^2$ orbital of $Pt_{ML}Ag$ is localized near −1 eV. This seems to be because an electronic structure of Pt on the $Pt_{ML}Ag$ surface is unstable by being deformed due to a difference in lattice constant between Pt and Ag (described earlier). The fact that $Pt_{ML}Ag$ thus has a higher electron density near the Fermi level than Pt and $Pt_{ML}Pd$ due to a change in electronic structure by the difference in lattice constant between Pt and Ag suggests that $Pt_{ML}Ag$ has higher catalytic activity than Pt and $Pt_{ML}Pd$.

(5. Oxygen Reduction Reaction Including Step of Oxygen Molecule Dissociation)

It is revealed here that as described earlier, an oxygen molecule is stably adsorbed onto a catalytic surface in both Pt and $Pt_{ML}Ag$ by being dissociated into oxygen atoms. Thus, of the three reaction models of the oxygen reduction reaction, attention is focused on the oxygen reduction reaction which includes the step of oxygen molecule dissociation and in which a reaction at the second stage which reaction follows an oxygen molecule adsorption reaction at the first stage is an oxygen molecule dissociation reaction. This is because reaction(s) subsequent to the reaction at the second stage is/are considered to easily proceed in a case where an oxygen molecule is adsorbed onto a catalytic surface while being dissociated into oxygen atoms.

In view of the above, free energy G obtained in each state in the oxygen reduction reaction which includes the step of oxygen molecule dissociation and in which Pt and $Pt_{ML}Ag$ are used as catalysts is calculated, an amount of change ΔG in free energy is calculated in each state. A method for calculating free energy G is as described below. Free energy G is given by the following equation: G=H−TS where H is enthalpy, T is temperature, and S is entropy. The enthalpy H is given by a sum of (i) potential energy resulting from interaction between an atomic nucleus and an electron and (ii) kinetic energy of the atomic nucleus (i.e., energy resulting from thermal motion of a molecule and an atom).

Further, for each of Pt and $Pt_{ML}Ag$, free energy is calculated with respect to not only a state (U=0V) in which no electric potential is applied but also a state in which an electric potential of 0.7 V is applied and a state in which an electric potential of 0.9 V is applied. Free energy is calculated assuming that (i) the electric potential of 0.7 V is a numerical value based on 0.7 V, which is a drive voltage of a common fuel cell, and (ii) the electric potential of 0.9 V is an upper limit of a drive voltage of a fuel cell. Note that free energy is calculated assuming that the temperature T is 300K.

FIG. 11 has charts showing a change in free energy obtained in each state in the oxygen reduction reaction which includes the step of oxygen molecule dissociation. (a) of FIG. 11 shows a result of calculation in a case where Pt is used as a catalyst. (b) of FIG. 11 shows a result of calculation in a case where $Pt_{ML}Ag$ is used as a catalyst. Note that in FIG. 11, $O_2$ shows a state in which an oxygen molecule is present in a molecular state, O* shows a state in which an oxygen atom is adsorbed onto a catalytic surface, OH* shows a state in which OH is adsorbed onto the catalytic surface, $H_2O$* shows a state in which $H_2O$ is adsorbed onto the catalytic surface, and $H_2O$ shows a state in which $H_2O$ is desorbed from the catalytic surface. Same applies to the drawings following FIG. 11.

FIG. 12 shows, for each electric potential applied, the changes, shown in (a) and (b) of FIG. 11, in free energy obtained in each state in the oxygen reduction reaction in which Pt and $Pt_{ML}Ag$ are used as catalysts. (a) of FIG. 12 shows a state in which no electric potential is applied. (b) of FIG. 12 shows a state in which an electric potential of 0.7 V is applied. (c) of FIG. 12 shows a state in which an electric potential of 0.9 V is applied. Note that in FIG. 12, a state in which lowest free energy is obtained is shown by a thick line.

As shown in (a) and (b) of FIG. 11, and (a) of FIG. 12, in a case where no electric potential is applied, lowest free energy is obtained in the state of $H_2O$* in both Pt and $Pt_{ML}Ag$. This reveals that no activation barrier is present before the state of $H_2O$* and thus the oxygen reduction reaction easily proceeds. Further, also in an $H_2O$ desorption reaction, in which free energy increases, an activation barrier shown by a difference in free energy between $H_2O$* and $H_2O$ is also less great in value. Specifically, in the state in which no electric potential is applied, the oxygen reduction reaction which includes the step of oxygen molecule dissociation is considered to proceed in both Pt and $Pt_{ML}Ag$.

In contrast, as shown in (b) and (c) of FIG. 12, lowest free energy is obtained in a state before the state of $H_2O$* in a case where an electric potential is applied. This reveals that an activation barrier is present also in a reaction process before the $H_2O$ desorption reaction. Further, as shown in (a) and (b) of FIG. 11, in a case where a higher electric potential is applied, free energy has a greater value accordingly. This reveals that the application of an electric potential prevents the oxygen reduction reaction from proceeding.

As described earlier, in a state in which no electric potential is applied, the oxygen reduction reaction which includes the step of oxygen molecule dissociation is considered to more easily proceed than the other reaction models of the oxygen reduction reaction. Note, however, that in a state in which an electric potential is applied, as in a cathode electrode of a fuel cell, an activation barrier is great in the oxygen reduction reaction and thus the oxygen reduction reaction is considered to less easily proceed.

(6. Oxygen Reduction Reaction Including No Step of Oxygen Molecule Dissociation)

As described earlier, in the state in which an electric potential is applied, the oxygen reduction reaction which includes the step of oxygen molecule dissociation is considered to less easily proceed, whereas the oxygen reduction reaction which includes no step of oxygen molecule dissociation and includes the step of, for example, hydrogen peroxide dissociation or peroxyl dissociation is considered to predominantly proceed. Thus, a reaction model including no step of oxygen molecule dissociation is used to carry out study of the oxygen reduction reaction with respect to each of Pt and $Pt_{ML}Ag$.

(6.1. Oxygen Reduction Reaction in which Pt is Used)

In the oxygen reduction reaction which includes no step of oxygen molecule dissociation and in which Pt is used, an oxygen molecule is adsorbed onto a catalytic surface in a molecular state without being dissociated into oxygen atoms. Thus, as illustrated in FIG. 7, two sites, which are the Top site and the S-bridge site, are assumed as adsorption sites of the oxygen molecule in the oxygen reduction reaction which includes no step of oxygen molecule dissociation and in which Pt is used.

Note here that a comparison between the oxygen reduction reaction which includes the step of hydrogen peroxide dissociation and the oxygen reduction reaction which includes the step of peroxyl dissociation shows that the oxygen reduction reaction which includes the step of hydrogen peroxide dissociation and the oxygen reduction reaction which includes the step of peroxyl dissociation differ in that oxygen atoms are uncoupled in the state of $H_2O_2$* in the oxygen reduction reaction which includes the step of hydrogen peroxide dissociation, whereas oxygen atoms are uncoupled in a state of OOH* in the oxygen reduction reaction which includes the step of peroxyl dissociation. Specifically, the oxygen reduction reaction which includes no step of oxygen molecule dissociation and includes any of the steps of, for example, hydrogen peroxide dissociation and peroxyl dissociation proceeds such that an oxygen molecule ($O_2$) is adsorbed onto the catalytic surface first ($O_2$*) in a molecular state, and then the adsorbed oxygen molecule ($O_2$*) reacts with a proton ($H^+$), so that OOH* is formed. Thus, potential energy obtained in a state in which OOH is adsorbed onto a Pt surface is calculated with respect to each of a case where an oxygen molecule is adsorbed onto the Top site and a case where an oxygen molecule is adsorbed onto the S-bridge site.

FIG. 13 is a chart showing potential energy obtained in a state in which OOH is adsorbed onto a Pt surface. FIG. 14 has views each illustrating a state in which OOH is adsorbed onto a Pt surface. (a) of FIG. 14 illustrates a state in which OOH is adsorbed onto the Top site of the Pt surface. (b) of FIG. 14 illustrates a state in which OOH is adsorbed onto the S-bridge site of the Pt surface. In each of (a) and (b) of FIG. 14, the drawing on the left is a top view of the Pt surface which is seen from above, and the drawing on the right is a cross-sectional view of the drawing on the left which drawing is seen from a corresponding one of an arrow I direction and an arrow J direction.

As shown in FIG. 13, in either of a case where an oxygen molecule is adsorbed onto the Top site, which is the adsorption site, and a case where an oxygen molecule is adsorbed onto the S-bridge site, which is the adsorption site, potential energy obtained in a case where OOH is adsorbed has a lower value than potential energy obtained in a case, shown in FIG. 6, where $O_2$ is adsorbed. This reveals that there is no activation barrier to a change from a state of $O_2$* to the state of OOH* in either of the case where an oxygen molecule is adsorbed onto the Top site, which is the adsorption site, and the case where an oxygen molecule is adsorbed onto the S-bridge site, which is the adsorption site.

Next, potential energy is calculated with respect to a state ($H_2O_2$*) into which each of the states of (a) and (b) of FIG. 14 has been changed by further adsorption of a proton onto the catalytic surface.

FIG. 15 is a view illustrating a state into which each of the states of (a) and (b) of FIG. 14 has been changed by further adsorption of a proton onto the Pt surface. In FIG. 15, the drawing on the left is a top view of the Pt surface which is seen from above, and the drawing on the right is a cross-sectional view of the drawing on the left which drawing is seen from an arrow K direction. Note that in a case where a proton is further adsorbed onto the catalytic surface in each of the states of (a) and (b) of FIG. 14, an oxygen molecule which is adsorbed onto either of adsorption sites, i.e., the Top site and the S-bridge site, is adsorbed in a state illustrated in FIG. 15, i.e., onto the S-bridge site.

In the state illustrated in FIG. 15, potential energy ΔE of −4.81 eV is obtained. This reveals that in either of the case where an oxygen molecule is adsorbed onto the Top site, which is the adsorption site, and the case where an oxygen molecule is adsorbed onto the S-bridge site, which is the adsorption site, there is no activation barrier to a change from each of the states (OOH*) illustrated in (a) and (b) of FIG. 14 to the state ($H_2O_2$*) in which the proton is further adsorbed.

Next, potential energy is calculated with respect to a state ($H_3O_2$*) into which the state illustrated in FIG. 15 has been changed by further adsorption of a proton. FIG. 16 is a view illustrating a state into which the state illustrated in FIG. 15 has been changed by further adsorption of a proton onto the Pt surface. In FIG. 16, the drawing on the left is a top view of the Pt surface which is seen from above, and the drawing on the right is a cross-sectional view of the drawing on the left which drawing is seen from an arrow L direction. In the state illustrated in FIG. 16, potential energy ΔE of −5.48 eV is obtained. This reveals that there is no activation barrier to a change from the state ($H_2O_2$*) illustrated in FIG. 15 to the state ($H_3O_2$*) in which the proton is further adsorbed.

In view of the above description, Pt can be said to have no activation barrier during a period in which an oxygen molecule is adsorbed onto the Pt surface and then the state of $H_3O_2$* arises.

Next, dissociation into oxygen atoms is discussed. In a case where the oxygen reduction reaction which includes the step of peroxyl dissociation proceeds, oxygen atoms are uncoupled in a state in which OOH is adsorbed onto the catalytic surface (see FIG. 2). Meanwhile, in a case where the oxygen reduction reaction which includes the step of hydrogen peroxide dissociation proceeds, oxygen atoms are uncoupled in a state in which $H_2O_2$ is adsorbed onto the catalytic surface (see FIG. 3).

Under the circumstances, oxygen interatomic distances obtained in the respective states of FIGS. 14 through 16 are found. In the state illustrated in (a) of FIG. 14, the oxygen interatomic distance is 2.29 Å. In the state illustrated in (b) of FIG. 14, the oxygen interatomic distance is 2.66 Å. Similarly, in the state illustrated in FIG. 15, the oxygen interatomic distance is 2.81 Å. Further, in the state illustrated in FIG. 16, the oxygen interatomic distance is 2.34 Å.

Next, free energy obtained in each state in the reaction model (described earlier, i.e., the reaction model including no step of oxygen molecule dissociation) in which Pt is used as a catalyst is calculated. Further, as in the case of the reaction model including the step of oxygen dissociation, free energy is calculated with respect to not only the state in which no electric potential (0V) is applied but also the state in which an electric potential of 0.7 V is applied and the state in which an electric potential of 0.9 V is applied.

FIG. 17 shows a difference in free energy obtained in each state in the oxygen reduction reaction in which Pt is used as a catalyst. (a) of FIG. 17 shows a difference in free energy obtained in each state in a case where the oxygen reduction reaction proceeds in a state in which an oxygen molecule is adsorbed onto the S-bridge site. (b) of FIG. 17 shows a difference in free energy obtained in each state in a case where the oxygen reduction reaction proceeds in a state in which an oxygen molecule is adsorbed onto the Top site. As shown in (a) and (b) of FIG. 17, a comparison between (a) a state of $H_2O+OH$*, which is a state in which a water molecule is desorbed from the state of $H_3O_2$* and OH is adsorbed onto the catalytic surface and (b) the state of $H_3O_2$* shows an increase in free energy even in a case where any electric potential is applied. This reveals that an activation barrier is present in a water molecule desorbing step in either of the case where an oxygen molecule is adsorbed onto the S-bridge site, which is the adsorption site, and the case where an oxygen molecule is adsorbed onto the Top site, which is the adsorption site.

(6.2. Oxygen Reduction Reaction in which $Pt_{ML}Ag$ is Used)

The following description discusses the oxygen reduction reaction in which $Pt_{ML}Ag$ is used.

As illustrated in FIG. 8, an oxygen molecule which is adsorbed onto the Top site, the S-bridge site, or the L-bridge site of a $Pt_{ML}Ag$ surface is in a molecular state, whereas an oxygen molecule which is adsorbed onto the Hollow site of the $Pt_{ML}Ag$ surface is dissociated into oxygen atoms. Thus, in order to study the oxygen reduction reaction which includes no step of oxygen molecule dissociation, potential energy obtained in a state of adsorption of OOH, which state follows a state of adsorption of an oxygen molecule, is calculated with respect to each of a case where the oxygen molecule is adsorbed onto the Top site, a case where the oxygen molecule is adsorbed onto the S-bridge site, and a case where the oxygen molecule is adsorbed onto the L-bridge site.

FIG. 18 illustrates a state in which OOH is adsorbed onto a $Pt_{ML}Ag$ surface. (a) of FIG. 18 illustrates a case where an oxygen molecule is adsorbed onto the Top site of the $Pt_{ML}Ag$ surface. (b) and (c) of FIG. 18 each illustrate a case where an oxygen molecule is adsorbed onto the L-bridge site of the $Pt_{ML}Ag$ surface. (d) and (e) of FIG. 18 each illustrate a case where an oxygen molecule is adsorbed onto the S-bridge site of the $Pt_{ML}Ag$ surface. In FIG. 18, the drawing on the left is a top view of the $Pt_{ML}Ag$ surface which is seen from above, and the drawing on the right is a cross-sectional view of the drawing on the left which drawing is seen from a corresponding one of an arrow M direction through an arrow Q direction.

As illustrated in (a) of FIG. 18, in a case where the oxygen molecule is adsorbed onto the Top site, OOH* is adsorbed onto the L-bridge site. In this case, potential energy of −2.52 eV is obtained. Meanwhile, in a case where the oxygen molecule is adsorbed onto the L-bridge site, OOH* may be adsorbed onto the Hollow site as illustrated in (b) of FIG. 18, or may be adsorbed onto the L-bridge site as illustrated in (c) of FIG. 18. Note that potential energy of −4.30 eV is obtained in a state in which OOH* is adsorbed onto the Hollow site, whereas potential energy of −2.52 eV is obtained in a state in which OOH* is adsorbed onto the L-bridge site. A state illustrated in (c) of FIG. 18 is identical to a state illustrated in (a) of FIG. 18. In a case where the oxygen molecule is adsorbed onto the S-bridge site, OOH* may be in a state in which the oxygen molecule is arranged in the [−110] direction as illustrated in (d) of FIG. 18, or may be in a state in which the oxygen molecule is arranged in the [001] direction as illustrated in (e) of FIG. 18. Note that potential energy of −2.34 eV is obtained in the state in which the oxygen molecule is arranged in the [−110] direction, whereas potential energy of −2.59 eV is obtained in the state in which the oxygen molecule is arranged in the [001] direction.

Next, potential energy obtained in a state ($H_2O_2$*) into which each of the states (OOH*) illustrated in (a) through (e) of FIG. 18 has been changed by further adsorption of a proton onto the $Pt_{ML}Ag$ surface is calculated.

FIG. 19 illustrates a state in which $H_2O_2$ is adsorbed onto the $Pt_{ML}Ag$ surface. (a) of FIG. 19 illustrates a state into which each of the states illustrated in (a) and (c) of FIG. 18 has been changed by further adsorption of a proton. (b) of FIG. 19 illustrates a state into which the state illustrated in (b) of FIG. 18 has been changed by further adsorption of a proton. (c) of FIG. 19 illustrates a state into which the state illustrated in (d) of FIG. 18 has been changed by further adsorption of a proton. (d) of FIG. 19 illustrates a state into which the state illustrated in (e) of FIG. 18 has been changed by further adsorption of a proton. In FIG. 19, the drawing on the left is a top view of the $Pt_{ML}Ag$ surface which is seen from above, and the drawing on the right is a cross-sectional view of the drawing on the left which drawing is seen from a corresponding one of an arrow R direction through an arrow U direction. In the state illustrated in (a) of FIG. 19, potential energy of −5.46 eV is obtained. In the state illustrated in (b) of FIG. 19, potential energy of −3.56 eV is obtained. In the state illustrated in (c) of FIG. 19, potential energy of −4.26 eV is obtained. In the state illustrated in (d) of FIG. 19, potential energy of −4.27 eV is obtained.

Subsequently, potential energy obtained in a state ($H_3O_2$*) into which each of the states ($H_2O_2$*) illustrated in (a) through (d) of FIG. 19 has been changed by further adsorption of a proton onto the $Pt_{ML}Ag$ surface.

FIG. 20 illustrates a state in which $H_3O_2$ is adsorbed onto the $Pt_{ML}Ag$ surface. (a) of FIG. 20 illustrates a state into which the state illustrated in (a) of FIG. 19 has been changed by further adsorption of a proton. (b) of FIG. 20 illustrates a state into which the state illustrated in (b) of FIG. 19 has been changed by further adsorption of a proton. (c) of FIG. 20 illustrates a state into which the state illustrated in (c) of FIG. 19 has been changed by further adsorption of a proton. Note that in a case where a state into which the state illustrated in (d) of FIG. 19 has been changed by adsorption of a proton is assumed, no state is present in which potential energy is lower than that obtained in the state illustrated in (d) of FIG. 19. In the state illustrated in (c) of FIG. 20, potential energy of −5.14 eV is obtained.

FIG. 21 is a diagram showing a transition, made by a process of the oxygen reduction reaction which includes no step of oxygen molecule dissociation and in which PtMLAg is used, from the states illustrated in (a) through (c) of FIG. 8 to the states illustrated in FIGS. 18 through 20. As shown by arrows in FIG. 21, a pathway along which the oxygen reduction reaction which includes no step of oxygen molecule dissociation and in which $Pt_{ML}Ag$ is used proceeds is exemplified by five pathways a through c. According to the oxygen reduction reaction which proceeds along the pathway α, the oxygen molecule is adsorbed onto the L-bridge site in the state of $O_2$*, and the oxygen molecule is adsorbed onto the Hollow site in the state of OOH*, which state follows the state of $O_2$*. According to the oxygen reduction reaction which proceeds along the pathway β, the oxygen molecule is adsorbed onto the L-bridge site in the state of $O_2$*. The oxygen reduction reaction which proceeds along the pathway β subsequently proceeds also in a state in which the oxygen molecule is adsorbed onto the L-bridge site. According to the oxygen reduction reaction which proceeds along the pathway γ, the oxygen molecule is adsorbed onto the Top site in the state of $O_2$*, and the oxygen molecule is adsorbed onto the L-bridge site in the state of OOH*. Then, subsequent reactions of the oxygen reduction reaction which proceeds along the pathway γ are identical to those of the oxygen reduction reaction which proceeds along the pathway β. According to the oxygen reduction reaction which proceeds along the pathway δ, the oxygen molecule is adsorbed onto the S-bridge site in the state of $O_2$* so as to be arranged in the [−110] direction, whereas the oxygen molecule is adsorbed onto the S-bridge site in the state of OOH* so as to be arranged in the [001] direction. Then, the oxygen reduction reaction which proceeds along the pathway δ proceeds to $H_2O_2$*. Note, however, that since the state of $H_2O_2$* is stable, the oxygen reduction reaction which proceeds along the pathway δ does not proceed to the state of $H_3O_2$*. According to the oxygen reduction reaction which proceeds along the pathway c, the oxygen molecule is adsorbed onto the S-bridge site in the state of $O_2$* so as to be arranged in the [−110] direction. The oxygen reduction reaction which proceeds along the pathway c subsequently proceeds to the states of OOH*, $H_2O_2$*, and $H_3O_2$* in this order also in a state in which the oxygen molecule is adsorbed onto the S-bridge site.

Note that in the following description, for convenience of description, a reaction pathway such as the pathway α, along which a location at which the oxygen molecule is adsorbed is changed from the L-bridge site to the Hollow site, is referred to an L-bridge to Hollow pathway, and a reaction pathway such as the pathway c, along which a state of the oxygen molecule which is adsorbed onto the S-bridge site so as to be arranged in the [−110] direction is not changed, is referred to as an S-bridge pathway.

Note here that oxygen interatomic distances obtained in the states, illustrated in FIG. 21, of OOH* and $H_2O_2$* are calculated. The oxygen interatomic distances obtained in the state of OOH* are 2.46 Å, 2.63 Å, 2.48 Å, and 2.62 Å in this order from the left of FIG. 21. Meanwhile, the oxygen interatomic distances obtained in the state of $H_2O_2$* are 2.66 Å, 3.37 Å, 2.54 Å, and 2.87 Å in this order from the left of FIG. 21.

Next, a change in free energy obtained in the oxygen reduction reaction which proceeds along each of the S-bridge and L-bridge to Hollow pathways and in which $Pt_{ML}Ag$ is used as a catalyst is calculated. Further, as in the case where Pt is used as a catalyst, free energy is calculated with respect to not only the state in which no electric potential (0V) is applied but also the state in which an electric potential of 0.7 V is applied and the state in which an electric potential of 0.9 V is applied.

FIG. 22 shows a change in free energy obtained in the oxygen reduction reaction in which $Pt_{ML}Ag$ is used as a catalyst. (a) of FIG. 22 shows a change in free energy obtained in the oxygen reduction reaction which proceeds along the S-bridge pathway. (b) of FIG. 22 shows a change in free energy obtained in the oxygen reduction reaction which proceeds along the L-bridge to Hollow pathway.

As shown in (a) and (b) of FIG. 22, it is revealed that according to the oxygen reduction reaction which proceeds along the S-bridge pathway, a value of an activation barrier which value is shown by a difference between (a) a lower limit of free energy and (b) a value of free energy obtained in the state of $H_2O+OH^*$ is less changed even in a case where an electric potential is applied. Meanwhile, according to the oxygen reduction reaction which proceeds along the S-bridge pathway, an activation barrier increases in a case where an electric potential is applied. Further, it is revealed that according to the oxygen reduction reaction which proceeds along the S-bridge pathway, as in the case, which is shown in FIG. 17 and in which Pt is used as a catalyst, an activation barrier is present in the water molecule desorbing step also in a case where $Pt_{ML}Ag$ is used as a catalyst.

Note that according to the oxygen reduction reaction which proceeds along the pathway β of FIG. 21, the case where $Pt_{ML}Ag$ is used as a catalyst is not found to be superior in free energy to the case where Pt is used as a catalyst.

(6.3. Comparison Between Pt and $Pt_{ML}Ag$)

FIG. 23 shows, for each electric potential applied, the changes in free energy, which changes are shown in FIGS. 17 and 22. (a) of FIG. 23 shows the state in which no electric potential is applied. (b) of FIG. 23 shows the state in which an electric potential of 0.7 V is applied. (c) of FIG. 23 shows the state in which an electric potential of 0.9 V is applied.

As shown in (b) and (c) of FIG. 23, it is revealed that also in a state in which a voltage is applied, the oxygen reduction reaction which proceeds along the S-bridge pathway and in which $Pt_{ML}Ag$ is used as a catalyst is lower in activation barrier than the oxygen reduction reaction in which Pt is used as a catalyst. This makes it possible to say that $Pt_{ML}Ag$ is more catalytically active than Pt also in the state in which an electric potential is applied.

The above description reveals that even under a condition for electric power generation by a fuel cell, a (110) surface of a core-shell catalyst ($Pt_{ML}Ag$) containing silver as a core material and containing platinum as a shell material is more catalytically active than a (110) surface of a catalyst (Pt) consisting solely of platinum. Further, as shown in FIG. 10, it is also revealed that a core-shell catalyst ($Pt_{ML}Pd$) containing palladium as a core material and containing platinum as a shell material is substantially as catalytically active as a catalyst (Pt) consisting solely of platinum.

As described earlier, a core-shell catalyst in accordance with an embodiment of the present invention for accelerating an oxygen reduction reaction, contains: silver or palladium as a core material; and platinum as a shell material, the core-shell catalyst having, on a surface thereof, a (110) surface of a face centered cubic lattice.

The core-shell catalyst is preferably arranged such that the core-shell catalyst has a shell that includes 1 to 3 atomic layers of the platinum.

A reaction acceleration method in accordance with an embodiment of the present invention for accelerating an oxygen reduction reaction by use of a (110) surface that is formed on a surface of a core-shell catalyst containing: silver or palladium as a core material; and platinum as a shell material, the reaction acceleration method includes: molecularly adsorbing an oxygen molecule onto the (110) surface; forming a water molecule by causing (i) the oxygen molecule adsorbed onto the (110) surface and (ii) a proton to react with each other; and desorbing the water molecule from the (110) surface.

The present invention is not limited to the embodiments, but can be altered by a skilled person in the art within the scope of the claims. The present invention also encompasses, in its technical scope, any embodiment derived by combining technical means disclosed in differing embodiments.

INDUSTRIAL APPLICABILITY

The present invention can be suitably used for a catalyst for an oxygen reduction reaction, especially for a cathode electrode catalyst of a fuel cell.

The invention claimed is:

1. A cathode electrode catalyst of a fuel cell, for which cathode electrode catalyst a core-shell catalyst for accelerating an oxygen reduction reaction is used,
said core-shell catalyst for accelerating an oxygen reduction reaction comprising:
silver as a core material; and
platinum as a shell material,
said core-shell catalyst having a shell that includes 1 to 3 atomic layers of the platinum, wherein
the cathode electrode catalyst has, on a surface thereof on which an oxygen reduction reaction occurs, a (110) surface of a face centered cubic lattice of the core-shell catalyst, and
the cathode electrode catalyst has a shell whose layer of the platinum has a surface which has, on the (110) surface of the surface of the cathode electrode catalyst, a greater lattice constant than a lattice constant of a platinum bulk material so as to be closer to a lattice constant of the silver, which is the core material.

2. A reaction acceleration method for accelerating an oxygen reduction reaction by use of a (110) surface that is formed on a surface of a core-shell catalyst containing: silver as a core material; and platinum as a shell material,
said reaction acceleration method comprising:
a first step of molecularly adsorbing an oxygen molecule onto the (110) surface;
a second step of forming a water molecule by causing (i) the oxygen molecule adsorbed onto the (110) surface and (ii) a proton to react with each other; and
a third step of desorbing the water molecule from the (110) surface,
wherein:
the core-shell catalyst is used for a cathode electrode catalyst of a fuel cell, and the oxygen reduction reaction is accelerated by use of the (110) surface that is formed on a surface of the cathode electrode catalyst on which surface the oxygen reduction reaction occurs;
the cathode electrode catalyst has a shell whose layer of the platinum has a surface which has, on the (110) surface of the surface of the cathode electrode catalyst, a greater lattice constant than a lattice constant of a platinum bulk material so as to be closer to a lattice constant of the silver, which is the core material;
in the first step, the oxygen molecule is molecularly adsorbed onto an adsorption site on the (110) surface, which adsorption site is present between platinum atoms in a [−100] direction, which is an in-plane direction, so that (i) a center of gravity of the oxygen molecule is located at the adsorption site and (ii) the oxygen molecule is arranged in the [−100] direction, which is the in-plane direction;
in the second step, in a state in which the oxygen molecule which has been adsorbed onto the (110) surface is adsorbed onto the adsorption site, the oxygen molecule and the proton are caused to react with each other so that the water molecule is formed;

in the third step, the water molecule is desorbed from the (110) surface; and in a state in which a drive voltage of the fuel cell is applied, the cathode electrode catalyst is lower in activation barrier for causing a reaction to proceed in the third step, as compared with a catalyst consisting solely of platinum.

\* \* \* \* \*

UNITED STATES PATENT AND TRADEMARK OFFICE
CERTIFICATE OF CORRECTION

| | |
|---|---|
| PATENT NO. | : 11,527,761 B2 |
| APPLICATION NO. | : 16/441855 |
| DATED | : December 13, 2022 |
| INVENTOR(S) | : Koichi Matsutani et al. |

It is certified that error appears in the above-identified patent and that said Letters Patent is hereby corrected as shown below:

In the Claims

Column 16, Claim 2, Line 58 reads:
atoms in a [−100] direction, which is an in-plane
Whereas it should read:
atoms in a [-110] direction, which is an in-plane Column 16, Claim 2, Line 61 reads:
oxygen molecule is arranged in the [−100] direction,
Whereas it should read:
oxygen molecule is arranged in the [-110] direction, Signed and Sealed this
Fourteenth Day of February, 2023

Katherine Kelly Vidal
*Director of the United States Patent and Trademark Office*